United States Patent
Aziz et al.

(10) Patent No.: US 11,240,262 B1
(45) Date of Patent: Feb. 1, 2022

(54) MALWARE DETECTION VERIFICATION AND ENHANCEMENT BY COORDINATING ENDPOINT AND MALWARE DETECTION SYSTEMS

(71) Applicant: FireEye, Inc., Milpitas, CA (US)

(72) Inventors: Ashar Aziz, Coral Gables, FL (US); Osman Abdoul Ismael, Palo Alto, CA (US)

(73) Assignee: FireEye Security Holdings US LLC, Milpitas, CA (US)

( * ) Notice: Subject to any disclaimer, the term of this patent is extended or adjusted under 35 U.S.C. 154(b) by 0 days.

(21) Appl. No.: 16/666,335

(22) Filed: Oct. 28, 2019

Related U.S. Application Data

(63) Continuation of application No. 15/633,226, filed on Jun. 26, 2017, now Pat. No. 10,462,173.

(Continued)

(51) Int. Cl.
H04L 29/06 (2006.01)

(52) U.S. Cl.
CPC ........ H04L 63/1433 (2013.01); H04L 63/145 (2013.01); H04L 63/1408 (2013.01)

(58) Field of Classification Search
CPC ...... G06F 21/566; G06F 21/56; G06F 21/554; G06F 21/552; G06F 21/577;

(Continued)

(56) References Cited

U.S. PATENT DOCUMENTS

| | | |
|---|---|---|
| 4,292,580 A | 9/1981 | Ott et al. |
| 5,175,732 A | 12/1992 | Hendel et al. |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

U.S. Appl. No. 15/633,226, filed Jun. 26, 2017 Non-Final Office Action dated Jan. 10, 2019.

(Continued)

*Primary Examiner* — Techane Gergiso
(74) *Attorney, Agent, or Firm* — Rutan & Tucker, LLP

(57) ABSTRACT

Computerized techniques to determine and verify maliciousness of an object by a security logic engine are described. A method features receiving information pertaining to a first set of events associated with a first object (first information) from an endpoint and information pertaining to a second set of events associated with a second object (second information) from an analysis system. Thereafter, the likelihood of the cyber-attack being conducted on the network is determined by at least correlating the first information and the second information with at least events associated with known malicious objects. Any endpoint vulnerable to the cyber-attack are identified based on a configuration of each of the plurality of endpoints and requesting the analysis system to conduct one or more further analyses in accordance with at least a software profile identified in a configuration of the first endpoint of the plurality of endpoints identified as vulnerable.

19 Claims, 7 Drawing Sheets

Related U.S. Application Data

(60) Provisional application No. 62/357,119, filed on Jun. 30, 2016.

(58) Field of Classification Search
CPC .............. H04L 63/145; H04L 63/1416; H04L 63/1425; H04L 63/1441; H04L 63/1491; H04L 63/20; H04L 63/0227; H04L 63/14; H04L 63/1433; H04L 63/1408; H04W 12/1208; H04W 12/12
See application file for complete search history.

(56) References Cited

U.S. PATENT DOCUMENTS

| | | | |
|---|---|---|---|
| 5,319,776 | A | 6/1994 | Hile et al. |
| 5,440,723 | A | 8/1995 | Arnold et al. |
| 5,490,249 | A | 2/1996 | Miller |
| 5,657,473 | A | 8/1997 | Killean et al. |
| 5,802,277 | A | 9/1998 | Cowlard |
| 5,842,002 | A | 11/1998 | Schnurer et al. |
| 5,960,170 | A | 9/1999 | Chen et al. |
| 5,978,917 | A | 11/1999 | Chi |
| 5,983,348 | A | 11/1999 | Ji |
| 6,088,803 | A | 7/2000 | Tso et al. |
| 6,092,194 | A | 7/2000 | Touboul |
| 6,094,677 | A | 7/2000 | Capek et al. |
| 6,108,799 | A | 8/2000 | Boulay et al. |
| 6,154,844 | A | 11/2000 | Touboul et al. |
| 6,269,330 | B1 | 7/2001 | Cidon et al. |
| 6,272,641 | B1 | 8/2001 | Ji |
| 6,279,113 | B1 | 8/2001 | Vaidya |
| 6,298,445 | B1 | 10/2001 | Shostack et al. |
| 6,357,008 | B1 | 3/2002 | Nachenberg |
| 6,424,627 | B1 | 7/2002 | Sorhaug et al. |
| 6,442,696 | B1 | 8/2002 | Wray et al. |
| 6,484,315 | B1 | 11/2002 | Ziese |
| 6,487,666 | B1 | 11/2002 | Shanklin et al. |
| 6,493,756 | B1 | 12/2002 | O'Brien et al. |
| 6,550,012 | B1 | 4/2003 | Villa et al. |
| 6,775,657 | B1 | 8/2004 | Baker |
| 6,831,893 | B1 | 12/2004 | Ben Nun et al. |
| 6,832,367 | B1 | 12/2004 | Choi et al. |
| 6,895,550 | B2 | 5/2005 | Kanchirayappa et al. |
| 6,898,632 | B2 | 5/2005 | Gordy et al. |
| 6,907,396 | B1 | 6/2005 | Muttik et al. |
| 6,941,348 | B2 | 9/2005 | Petry et al. |
| 6,971,097 | B1 | 11/2005 | Wallman |
| 6,981,279 | B1 | 12/2005 | Arnold et al. |
| 7,007,107 | B1 | 2/2006 | Ivchenko et al. |
| 7,028,179 | B2 | 4/2006 | Anderson et al. |
| 7,043,757 | B2 | 5/2006 | Hoefelmeyer et al. |
| 7,058,822 | B2 | 6/2006 | Edery et al. |
| 7,069,316 | B1 | 6/2006 | Gryaznov |
| 7,080,407 | B1 | 7/2006 | Zhao et al. |
| 7,080,408 | B1 | 7/2006 | Pak et al. |
| 7,093,002 | B2 | 8/2006 | Wolff et al. |
| 7,093,239 | B1 | 8/2006 | van der Made |
| 7,096,498 | B2 | 8/2006 | Judge |
| 7,100,201 | B2 | 8/2006 | Izatt |
| 7,107,617 | B2 | 9/2006 | Hursey et al. |
| 7,159,149 | B2 | 1/2007 | Spiegel et al. |
| 7,213,260 | B2 | 5/2007 | Judge |
| 7,231,667 | B2 | 6/2007 | Jordan |
| 7,240,364 | B1 | 7/2007 | Branscomb et al. |
| 7,240,368 | B1 | 7/2007 | Roesch et al. |
| 7,243,371 | B1 | 7/2007 | Kasper et al. |
| 7,249,175 | B1 | 7/2007 | Donaldson |
| 7,287,278 | B2 | 10/2007 | Liang |
| 7,308,716 | B2 | 12/2007 | Danford et al. |
| 7,328,453 | B2 | 2/2008 | Merkle, Jr. et al. |
| 7,346,486 | B2 | 3/2008 | Ivancic et al. |
| 7,356,736 | B2 | 4/2008 | Natvig |
| 7,386,888 | B2 | 6/2008 | Liang et al. |
| 7,392,542 | B2 | 6/2008 | Bucher |
| 7,418,729 | B2 | 8/2008 | Szor |
| 7,428,300 | B1 | 9/2008 | Drew et al. |
| 7,441,272 | B2 | 10/2008 | Durham et al. |
| 7,448,084 | B1 | 11/2008 | Apap et al. |
| 7,458,098 | B2 | 11/2008 | Judge et al. |
| 7,464,404 | B2 | 12/2008 | Carpenter et al. |
| 7,464,407 | B2 | 12/2008 | Nakae et al. |
| 7,467,408 | B1 | 12/2008 | O'Toole, Jr. |
| 7,478,428 | B1 | 1/2009 | Thomlinson |
| 7,480,773 | B1 | 1/2009 | Reed |
| 7,487,543 | B2 | 2/2009 | Arnold et al. |
| 7,496,960 | B1 | 2/2009 | Chen et al. |
| 7,496,961 | B2 | 2/2009 | Zimmer et al. |
| 7,519,990 | B1 | 4/2009 | Xie |
| 7,523,493 | B2 | 4/2009 | Liang et al. |
| 7,530,104 | B1 | 5/2009 | Thrower et al. |
| 7,540,025 | B2 | 5/2009 | Tzadikario |
| 7,546,638 | B2 | 6/2009 | Anderson et al. |
| 7,565,550 | B2 | 7/2009 | Liang et al. |
| 7,568,233 | B1 | 7/2009 | Szor et al. |
| 7,584,455 | B2 | 9/2009 | Ball |
| 7,603,715 | B2 | 10/2009 | Costa et al. |
| 7,607,171 | B1 | 10/2009 | Marsden et al. |
| 7,639,714 | B2 | 12/2009 | Stolfo et al. |
| 7,644,441 | B2 | 1/2010 | Schmid et al. |
| 7,657,419 | B2 | 2/2010 | van der Made |
| 7,676,841 | B2 | 3/2010 | Sobchuk et al. |
| 7,694,150 | B1 * | 4/2010 | Kirby ..................... G06F 21/56 713/188 |
| 7,698,548 | B2 | 4/2010 | Shelest et al. |
| 7,707,633 | B2 | 4/2010 | Danford et al. |
| 7,712,136 | B2 | 5/2010 | Sprosts et al. |
| 7,730,011 | B1 | 6/2010 | Deninger et al. |
| 7,739,740 | B1 | 6/2010 | Nachenberg et al. |
| 7,779,463 | B2 | 8/2010 | Stolfo et al. |
| 7,784,097 | B1 | 8/2010 | Stolfo et al. |
| 7,832,008 | B1 | 11/2010 | Kraemer |
| 7,836,502 | B1 | 11/2010 | Zhao et al. |
| 7,849,506 | B1 | 12/2010 | Dansey et al. |
| 7,854,007 | B2 | 12/2010 | Sprosts et al. |
| 7,869,073 | B2 | 1/2011 | Oshima |
| 7,877,803 | B2 | 1/2011 | Enstone et al. |
| 7,904,959 | B2 | 3/2011 | Sidiroglou et al. |
| 7,908,660 | B2 | 3/2011 | Bahl |
| 7,930,738 | B1 | 4/2011 | Petersen |
| 7,937,387 | B2 | 5/2011 | Frazier et al. |
| 7,937,761 | B1 | 5/2011 | Bennett |
| 7,949,849 | B2 | 5/2011 | Lowe et al. |
| 7,996,556 | B2 | 8/2011 | Raghavan et al. |
| 7,996,836 | B1 | 8/2011 | McCorkendale et al. |
| 7,996,904 | B1 | 8/2011 | Chiueh et al. |
| 7,996,905 | B2 | 8/2011 | Arnold et al. |
| 8,006,305 | B2 | 8/2011 | Aziz |
| 8,010,667 | B2 | 8/2011 | Zhang et al. |
| 8,020,206 | B2 | 9/2011 | Hubbard et al. |
| 8,028,338 | B1 | 9/2011 | Schneider et al. |
| 8,042,184 | B1 | 10/2011 | Batenin |
| 8,045,094 | B2 | 10/2011 | Teragawa |
| 8,045,458 | B2 | 10/2011 | Alperovitch et al. |
| 8,069,484 | B2 | 11/2011 | McMillan et al. |
| 8,087,086 | B1 | 12/2011 | Lai et al. |
| 8,171,553 | B2 | 5/2012 | Aziz et al. |
| 8,176,049 | B2 | 5/2012 | Deninger et al. |
| 8,176,480 | B1 | 5/2012 | Spertus |
| 8,201,246 | B1 | 6/2012 | Wu et al. |
| 8,204,984 | B1 | 6/2012 | Aziz et al. |
| 8,214,905 | B1 | 7/2012 | Doukhvalov et al. |
| 8,220,055 | B1 | 7/2012 | Kennedy |
| 8,225,288 | B2 | 7/2012 | Miller et al. |
| 8,225,373 | B2 | 7/2012 | Kraemer |
| 8,233,882 | B2 | 7/2012 | Rogel |
| 8,234,640 | B1 | 7/2012 | Fitzgerald et al. |
| 8,234,709 | B2 | 7/2012 | Viljoen et al. |
| 8,239,944 | B1 | 8/2012 | Nachenberg et al. |
| 8,260,914 | B1 | 9/2012 | Ranjan |
| 8,266,091 | B1 | 9/2012 | Gubin et al. |
| 8,286,251 | B2 | 10/2012 | Eker et al. |
| 8,291,499 | B2 | 10/2012 | Aziz et al. |
| 8,307,435 | B1 | 11/2012 | Mann et al. |
| 8,307,443 | B2 | 11/2012 | Wang et al. |

(56) References Cited

U.S. PATENT DOCUMENTS

| | | | |
|---|---|---|---|
| 8,312,545 B2 | 11/2012 | Tuvell et al. | |
| 8,321,936 B1 | 11/2012 | Green et al. | |
| 8,321,941 B2 | 11/2012 | Tuvell et al. | |
| 8,332,571 B1 | 12/2012 | Edwards, Sr. | |
| 8,365,286 B2 | 1/2013 | Poston | |
| 8,365,297 B1 | 1/2013 | Parshin et al. | |
| 8,370,938 B1 | 2/2013 | Daswani et al. | |
| 8,370,939 B2 | 2/2013 | Zaitsev et al. | |
| 8,375,444 B2 | 2/2013 | Aziz et al. | |
| 8,381,299 B2 | 2/2013 | Stolfo et al. | |
| 8,402,529 B1 | 3/2013 | Green et al. | |
| 8,458,462 B1 * | 6/2013 | Hanna | H04L 63/10 713/163 |
| 8,464,340 B2 | 6/2013 | Ahn et al. | |
| 8,479,174 B2 | 7/2013 | Chiriac | |
| 8,479,276 B1 | 7/2013 | Vaystikh et al. | |
| 8,479,291 B1 | 7/2013 | Bodke | |
| 8,510,827 B1 | 8/2013 | Leake et al. | |
| 8,510,828 B1 | 8/2013 | Guo et al. | |
| 8,510,842 B2 | 8/2013 | Amit et al. | |
| 8,516,478 B1 | 8/2013 | Edwards et al. | |
| 8,516,590 B1 | 8/2013 | Ranadive et al. | |
| 8,516,593 B2 | 8/2013 | Aziz | |
| 8,522,348 B2 | 8/2013 | Chen et al. | |
| 8,528,086 B1 | 9/2013 | Aziz | |
| 8,533,824 B2 | 9/2013 | Hutton et al. | |
| 8,539,582 B1 | 9/2013 | Aziz et al. | |
| 8,549,638 B2 | 10/2013 | Aziz | |
| 8,555,391 B1 | 10/2013 | Demir et al. | |
| 8,561,177 B1 | 10/2013 | Aziz et al. | |
| 8,566,476 B2 | 10/2013 | Shiffer et al. | |
| 8,566,946 B1 | 10/2013 | Aziz et al. | |
| 8,584,094 B2 | 11/2013 | Dadhia et al. | |
| 8,584,234 B1 | 11/2013 | Sobel et al. | |
| 8,584,239 B2 | 11/2013 | Aziz et al. | |
| 8,595,834 B2 | 11/2013 | Xie et al. | |
| 8,627,476 B1 | 1/2014 | Satish et al. | |
| 8,635,696 B1 | 1/2014 | Aziz | |
| 8,682,054 B2 | 3/2014 | Xue et al. | |
| 8,682,812 B1 | 3/2014 | Ranjan | |
| 8,689,333 B2 | 4/2014 | Aziz | |
| 8,695,096 B1 | 4/2014 | Zhang | |
| 8,713,631 B1 | 4/2014 | Pavlyushchik | |
| 8,713,681 B2 | 4/2014 | Silberman et al. | |
| 8,726,392 B1 | 5/2014 | McCorkendale et al. | |
| 8,739,280 B2 | 5/2014 | Chess et al. | |
| 8,776,229 B1 | 7/2014 | Aziz | |
| 8,782,792 B1 | 7/2014 | Bodke | |
| 8,789,172 B2 | 7/2014 | Stolfo et al. | |
| 8,789,178 B2 | 7/2014 | Kejriwal et al. | |
| 8,793,278 B2 | 7/2014 | Frazier et al. | |
| 8,793,787 B2 | 7/2014 | Ismael et al. | |
| 8,805,947 B1 | 8/2014 | Kuzkin et al. | |
| 8,806,647 B1 | 8/2014 | Daswani et al. | |
| 8,832,829 B2 | 9/2014 | Manni et al. | |
| 8,850,570 B1 | 9/2014 | Ramzan | |
| 8,850,571 B2 | 9/2014 | Staniford et al. | |
| 8,881,234 B2 | 11/2014 | Narasimhan et al. | |
| 8,881,271 B2 | 11/2014 | Butler, II | |
| 8,881,282 B1 | 11/2014 | Aziz et al. | |
| 8,898,788 B1 | 11/2014 | Aziz et al. | |
| 8,935,779 B2 | 1/2015 | Manni et al. | |
| 8,949,257 B2 | 2/2015 | Shiffer et al. | |
| 8,984,638 B1 | 3/2015 | Aziz et al. | |
| 8,990,939 B2 | 3/2015 | Staniford et al. | |
| 8,990,944 B1 | 3/2015 | Singh et al. | |
| 8,997,219 B2 | 3/2015 | Staniford et al. | |
| 9,009,822 B1 | 4/2015 | Ismael et al. | |
| 9,009,823 B1 | 4/2015 | Ismael et al. | |
| 9,027,135 B1 | 5/2015 | Aziz | |
| 9,071,638 B1 | 6/2015 | Aziz et al. | |
| 9,104,867 B1 | 8/2015 | Thioux et al. | |
| 9,106,630 B2 | 8/2015 | Frazier et al. | |
| 9,106,694 B2 | 8/2015 | Aziz et al. | |
| 9,118,715 B2 | 8/2015 | Staniford et al. | |
| 9,159,035 B1 | 10/2015 | Ismael et al. | |
| 9,171,160 B2 | 10/2015 | Vincent et al. | |
| 9,176,843 B1 | 11/2015 | Ismael et al. | |
| 9,189,627 B1 | 11/2015 | Islam | |
| 9,195,829 B1 | 11/2015 | Goradia et al. | |
| 9,197,664 B1 | 11/2015 | Aziz et al. | |
| 9,203,862 B1 * | 12/2015 | Kashyap | G06F 11/1405 |
| 9,223,972 B1 | 12/2015 | Vincent et al. | |
| 9,225,740 B1 | 12/2015 | Ismael et al. | |
| 9,241,010 B1 | 1/2016 | Bennett et al. | |
| 9,251,343 B1 | 2/2016 | Vincent et al. | |
| 9,262,635 B2 | 2/2016 | Paithane et al. | |
| 9,268,936 B2 | 2/2016 | Butler | |
| 9,275,229 B2 | 3/2016 | LeMasters | |
| 9,282,109 B1 | 3/2016 | Aziz et al. | |
| 9,292,686 B2 | 3/2016 | Ismael et al. | |
| 9,294,501 B2 | 3/2016 | Mesdaq et al. | |
| 9,300,686 B2 | 3/2016 | Pidathala et al. | |
| 9,306,960 B1 | 4/2016 | Aziz | |
| 9,306,974 B1 | 4/2016 | Aziz et al. | |
| 9,311,479 B1 | 4/2016 | Manni et al. | |
| 9,355,247 B1 | 5/2016 | Thioux et al. | |
| 9,356,944 B1 | 5/2016 | Viz | |
| 9,363,280 B1 | 6/2016 | Rivlin et al. | |
| 9,367,681 B1 | 6/2016 | Ismael et al. | |
| 9,398,028 B1 | 7/2016 | Karandikar et al. | |
| 9,413,781 B2 | 8/2016 | Cunningham et al. | |
| 9,426,071 B1 | 8/2016 | Caldejon et al. | |
| 9,430,646 B1 | 8/2016 | Mushtaq et al. | |
| 9,432,389 B1 | 8/2016 | Khalid et al. | |
| 9,438,613 B1 | 9/2016 | Paithane et al. | |
| 9,438,622 B1 | 9/2016 | Staniford et al. | |
| 9,438,623 B1 | 9/2016 | Thioux et al. | |
| 9,459,901 B2 | 10/2016 | Jung et al. | |
| 9,467,460 B1 | 10/2016 | Otvagin et al. | |
| 9,483,644 B1 | 11/2016 | Paithane et al. | |
| 9,495,180 B2 | 11/2016 | Ismael | |
| 9,497,213 B2 | 11/2016 | Thompson et al. | |
| 9,507,935 B2 | 11/2016 | Ismael et al. | |
| 9,516,057 B2 | 12/2016 | Aziz | |
| 9,519,782 B2 | 12/2016 | Aziz et al. | |
| 9,536,091 B2 | 1/2017 | Paithane et al. | |
| 9,537,972 B1 | 1/2017 | Edwards et al. | |
| 9,560,059 B1 | 1/2017 | Islam | |
| 9,565,202 B1 | 2/2017 | Kindlund et al. | |
| 9,591,015 B1 | 3/2017 | Amin et al. | |
| 9,591,020 B1 | 3/2017 | Aziz | |
| 9,594,904 B1 | 3/2017 | Jain et al. | |
| 9,594,905 B1 | 3/2017 | Ismael et al. | |
| 9,594,912 B1 | 3/2017 | Thioux et al. | |
| 9,609,007 B1 | 3/2017 | Rivlin et al. | |
| 9,626,509 B1 | 4/2017 | Khalid et al. | |
| 9,628,498 B1 | 4/2017 | Aziz et al. | |
| 9,628,507 B2 | 4/2017 | Haq et al. | |
| 9,633,134 B2 | 4/2017 | Ross | |
| 9,635,039 B1 | 4/2017 | Islam et al. | |
| 9,641,544 B1 * | 5/2017 | Treat | H04L 63/02 |
| 9,641,546 B1 | 5/2017 | Manni et al. | |
| 9,654,485 B1 | 5/2017 | Neumann | |
| 9,661,009 B1 | 5/2017 | Karandikar et al. | |
| 9,661,018 B1 | 5/2017 | Aziz | |
| 9,674,298 B1 | 6/2017 | Edwards et al. | |
| 9,680,862 B2 | 6/2017 | Ismael et al. | |
| 9,690,606 B1 | 6/2017 | Ha et al. | |
| 9,690,933 B1 | 6/2017 | Singh et al. | |
| 9,690,935 B2 | 6/2017 | Shiffer et al. | |
| 9,690,936 B1 | 6/2017 | Malik et al. | |
| 9,736,179 B2 | 8/2017 | Ismael | |
| 9,740,857 B2 | 8/2017 | Ismael et al. | |
| 9,747,446 B1 | 8/2017 | Pidathala et al. | |
| 9,749,353 B1 * | 8/2017 | Benskin | H04L 63/145 |
| 9,756,074 B2 | 9/2017 | Aziz et al. | |
| 9,773,112 B1 | 9/2017 | Rathor et al. | |
| 9,781,144 B1 | 10/2017 | Otvagin et al. | |
| 9,787,700 B1 | 10/2017 | Amin et al. | |
| 9,787,706 B1 | 10/2017 | Otvagin et al. | |
| 9,792,196 B1 | 10/2017 | Ismael et al. | |
| 9,800,590 B1 * | 10/2017 | Gates | H04L 63/1408 |
| 9,824,209 B1 | 11/2017 | Ismael et al. | |

(56) References Cited

U.S. PATENT DOCUMENTS

| | | |
|---|---|---|
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,405 B1 * | 12/2017 | Guo .................. H04L 63/1416 |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 9,998,484 B1 | 6/2018 | Buyukkayhan et al. |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,360,371 B1 * | 7/2019 | Watson .................. G06F 21/50 |
| 10,462,173 B1 | 10/2019 | Aziz et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0083343 A1 * | 6/2002 | Crosbie .................. G06F 21/552 726/23 |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |

(56) References Cited

U.S. PATENT DOCUMENTS

| | | |
|---|---|---|
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0047009 A1* | 2/2008 | Overcash ............ H04L 63/0209 726/23 |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0251363 A1 | 9/2010 | Todorovic |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |

(56) References Cited

U.S. PATENT DOCUMENTS

| | | | |
|---|---|---|---|
| 2011/0145926 A1* | 6/2011 | Dalcher | G06F 21/53 726/26 |
| 2011/0145934 A1 | 6/2011 | Abramovici et al. | |
| 2011/0167493 A1 | 7/2011 | Song et al. | |
| 2011/0167494 A1 | 7/2011 | Bowen et al. | |
| 2011/0173213 A1 | 7/2011 | Frazier et al. | |
| 2011/0173460 A1 | 7/2011 | Ito et al. | |
| 2011/0173699 A1* | 7/2011 | Figlin | H04L 63/1441 726/23 |
| 2011/0185428 A1* | 7/2011 | Sallam | H04L 63/145 726/24 |
| 2011/0219449 A1 | 9/2011 | St. Neitzel et al. | |
| 2011/0219450 A1 | 9/2011 | McDougal et al. | |
| 2011/0225624 A1 | 9/2011 | Sawhney et al. | |
| 2011/0225655 A1 | 9/2011 | Niemela et al. | |
| 2011/0247072 A1 | 10/2011 | Staniford et al. | |
| 2011/0265182 A1 | 10/2011 | Peinado et al. | |
| 2011/0289582 A1 | 11/2011 | Kejriwal et al. | |
| 2011/0302587 A1 | 12/2011 | Nishikawa et al. | |
| 2011/0307954 A1 | 12/2011 | Melnik et al. | |
| 2011/0307955 A1 | 12/2011 | Kaplan et al. | |
| 2011/0307956 A1 | 12/2011 | Yermakov et al. | |
| 2011/0314546 A1 | 12/2011 | Aziz et al. | |
| 2012/0023593 A1 | 1/2012 | Puder et al. | |
| 2012/0054869 A1 | 3/2012 | Yen et al. | |
| 2012/0066698 A1 | 3/2012 | Yanoo | |
| 2012/0079596 A1 | 3/2012 | Thomas et al. | |
| 2012/0084859 A1 | 4/2012 | Radinsky et al. | |
| 2012/0096553 A1 | 4/2012 | Srivastava et al. | |
| 2012/0110667 A1 | 5/2012 | Zubrilin et al. | |
| 2012/0117652 A1 | 5/2012 | Manni et al. | |
| 2012/0121154 A1 | 5/2012 | Xue et al. | |
| 2012/0124426 A1 | 5/2012 | Maybee et al. | |
| 2012/0174186 A1 | 7/2012 | Aziz et al. | |
| 2012/0174196 A1 | 7/2012 | Bhogavilli et al. | |
| 2012/0174218 A1 | 7/2012 | McCoy et al. | |
| 2012/0198279 A1 | 8/2012 | Schroeder | |
| 2012/0210423 A1 | 8/2012 | Friedrichs et al. | |
| 2012/0222121 A1 | 8/2012 | Staniford et al. | |
| 2012/0255003 A1* | 10/2012 | Sallam | G06F 21/554 726/23 |
| 2012/0255015 A1 | 10/2012 | Sahita et al. | |
| 2012/0255017 A1 | 10/2012 | Sallam | |
| 2012/0260342 A1 | 10/2012 | Dube et al. | |
| 2012/0266244 A1 | 10/2012 | Green et al. | |
| 2012/0278886 A1 | 11/2012 | Luna | |
| 2012/0297489 A1 | 11/2012 | Dequevy | |
| 2012/0330801 A1 | 12/2012 | McDougal et al. | |
| 2012/0331553 A1 | 12/2012 | Aziz et al. | |
| 2013/0014259 A1 | 1/2013 | Gribble et al. | |
| 2013/0036472 A1 | 2/2013 | Aziz | |
| 2013/0047257 A1 | 2/2013 | Aziz | |
| 2013/0074185 A1 | 3/2013 | McDougal et al. | |
| 2013/0086684 A1 | 4/2013 | Mohler | |
| 2013/0097699 A1 | 4/2013 | Balupari et al. | |
| 2013/0097706 A1 | 4/2013 | Titonis et al. | |
| 2013/0111587 A1 | 5/2013 | Goel et al. | |
| 2013/0117852 A1 | 5/2013 | Stute | |
| 2013/0117855 A1 | 5/2013 | Kim et al. | |
| 2013/0139264 A1 | 5/2013 | Brinkley et al. | |
| 2013/0145471 A1* | 6/2013 | Richard | G06F 21/562 726/24 |
| 2013/0152200 A1* | 6/2013 | Alme | G06F 21/52 726/24 |
| 2013/0160125 A1 | 6/2013 | Likhachev et al. | |
| 2013/0160127 A1 | 6/2013 | Jeong et al. | |
| 2013/0160130 A1 | 6/2013 | Mendelev et al. | |
| 2013/0160131 A1 | 6/2013 | Madou et al. | |
| 2013/0167236 A1 | 6/2013 | Sick | |
| 2013/0174214 A1 | 7/2013 | Duncan | |
| 2013/0185789 A1 | 7/2013 | Hagiwara et al. | |
| 2013/0185795 A1 | 7/2013 | Winn et al. | |
| 2013/0185798 A1 | 7/2013 | Saunders et al. | |
| 2013/0191915 A1 | 7/2013 | Antonakakis et al. | |
| 2013/0196649 A1 | 8/2013 | Paddon et al. | |
| 2013/0227691 A1 | 8/2013 | Aziz et al. | |
| 2013/0246370 A1 | 9/2013 | Bartram et al. | |
| 2013/0247186 A1 | 9/2013 | LeMasters | |
| 2013/0263260 A1 | 10/2013 | Mahaffey et al. | |
| 2013/0291109 A1 | 10/2013 | Staniford et al. | |
| 2013/0298230 A1 | 11/2013 | Kumar et al. | |
| 2013/0298243 A1 | 11/2013 | Kumar et al. | |
| 2013/0298244 A1* | 11/2013 | Kumar | H04L 67/10 726/25 |
| 2013/0318038 A1 | 11/2013 | Shiffer et al. | |
| 2013/0318073 A1 | 11/2013 | Shiffer et al. | |
| 2013/0325791 A1 | 12/2013 | Shiffer et al. | |
| 2013/0325792 A1 | 12/2013 | Shiffer et al. | |
| 2013/0325871 A1 | 12/2013 | Shiffer et al. | |
| 2013/0325872 A1 | 12/2013 | Shiffer et al. | |
| 2014/0032875 A1 | 1/2014 | Butler | |
| 2014/0053260 A1 | 2/2014 | Gupta et al. | |
| 2014/0053261 A1 | 2/2014 | Gupta et al. | |
| 2014/0130158 A1 | 5/2014 | Wang et al. | |
| 2014/0137180 A1* | 5/2014 | Lukacs | G06F 21/53 726/1 |
| 2014/0169762 A1 | 6/2014 | Ryu | |
| 2014/0179360 A1 | 6/2014 | Jackson et al. | |
| 2014/0181131 A1 | 6/2014 | Ross | |
| 2014/0189687 A1 | 7/2014 | Jung et al. | |
| 2014/0189866 A1 | 7/2014 | Shiffer et al. | |
| 2014/0189882 A1 | 7/2014 | Jung et al. | |
| 2014/0215621 A1* | 7/2014 | Xaypanya | H04L 63/145 726/23 |
| 2014/0237595 A1* | 8/2014 | Sridhara | G06F 21/55 726/23 |
| 2014/0237600 A1 | 8/2014 | Silberman et al. | |
| 2014/0280245 A1 | 9/2014 | Wilson | |
| 2014/0283037 A1 | 9/2014 | Sikorski et al. | |
| 2014/0283063 A1 | 9/2014 | Thompson et al. | |
| 2014/0328204 A1 | 11/2014 | Klotsche et al. | |
| 2014/0337836 A1 | 11/2014 | Ismael | |
| 2014/0344926 A1 | 11/2014 | Cunningham et al. | |
| 2014/0351935 A1 | 11/2014 | Shao et al. | |
| 2014/0380473 A1 | 12/2014 | Bu et al. | |
| 2014/0380474 A1 | 12/2014 | Paithane et al. | |
| 2015/0007312 A1 | 1/2015 | Pidathala et al. | |
| 2015/0096022 A1* | 4/2015 | Vincent | G06F 21/562 726/23 |
| 2015/0096023 A1 | 4/2015 | Mesdaq et al. | |
| 2015/0096024 A1 | 4/2015 | Haq et al. | |
| 2015/0096025 A1 | 4/2015 | Ismael | |
| 2015/0121449 A1 | 4/2015 | Cp et al. | |
| 2015/0180886 A1 | 6/2015 | Staniford et al. | |
| 2015/0186645 A1 | 7/2015 | Aziz et al. | |
| 2015/0199513 A1 | 7/2015 | Ismael et al. | |
| 2015/0199531 A1 | 7/2015 | Ismael et al. | |
| 2015/0199532 A1 | 7/2015 | Ismael et al. | |
| 2015/0220735 A1 | 8/2015 | Paithane et al. | |
| 2015/0372980 A1 | 12/2015 | Eyada | |
| 2015/0373039 A1* | 12/2015 | Wang | H04L 63/1425 726/23 |
| 2015/0379282 A1 | 12/2015 | Thota et al. | |
| 2016/0004869 A1 | 1/2016 | Ismael et al. | |
| 2016/0006756 A1 | 1/2016 | Ismael et al. | |
| 2016/0044000 A1 | 2/2016 | Cunningham | |
| 2016/0078365 A1* | 3/2016 | Baumard | G06N 20/00 706/12 |
| 2016/0127393 A1 | 5/2016 | Aziz et al. | |
| 2016/0173509 A1* | 6/2016 | Ray | H04L 63/1425 726/23 |
| 2016/0173510 A1 | 6/2016 | Harris et al. | |
| 2016/0173525 A1* | 6/2016 | Thomas | H04L 63/145 726/23 |
| 2016/0191547 A1 | 6/2016 | Zafar et al. | |
| 2016/0191550 A1 | 6/2016 | Ismael et al. | |
| 2016/0261612 A1 | 9/2016 | Mesdaq et al. | |
| 2016/0285914 A1 | 9/2016 | Singh et al. | |
| 2016/0301703 A1 | 10/2016 | Aziz | |
| 2016/0330219 A1* | 11/2016 | Hasan | G06N 5/025 |
| 2016/0335110 A1 | 11/2016 | Paithane et al. | |
| 2016/0373485 A1 | 12/2016 | Kamble | |

(56) References Cited

U.S. PATENT DOCUMENTS

| | | | |
|---|---|---|---|
| 2017/0083703 | A1 | 3/2017 | Abbasi et al. |
| 2017/0149807 | A1* | 5/2017 | Schilling ............. G06F 9/45558 |
| 2017/0185778 | A1 | 6/2017 | Sahita et al. |
| 2017/0235967 | A1* | 8/2017 | Ray .......................... G06F 21/54 |
| | | | 713/165 |
| 2017/0359306 | A1 | 12/2017 | Thomas et al. |
| 2018/0013770 | A1 | 1/2018 | Ismael |
| 2018/0048660 | A1 | 2/2018 | Paithane et al. |
| 2018/0121316 | A1 | 5/2018 | Ismael et al. |
| 2018/0288077 | A1 | 10/2018 | Siddiqui et al. |

FOREIGN PATENT DOCUMENTS

| | | | | |
|---|---|---|---|---|
| WO | 0206928 | A2 | 1/2002 | |
| WO | 02/23805 | A2 | 3/2002 | |
| WO | 2007117636 | A2 | 10/2007 | |
| WO | 2008/041950 | A2 | 4/2008 | |
| WO | 2011/084431 | A2 | 7/2011 | |
| WO | 2011/112348 | A1 | 9/2011 | |
| WO | 2012/075336 | A1 | 6/2012 | |
| WO | 2012/145066 | A1 | 10/2012 | |
| WO | 2013/067505 | A1 | 5/2013 | |
| WO | WO-2016049319 | A1 * | 3/2016 | ............. G06N 7/005 |
| WO | WO-2016097686 | A1 * | 6/2016 | ........... G06F 21/577 |

OTHER PUBLICATIONS

U.S. Appl. No. 15/633,226, filed Jun. 26, 2017 Notice of Allowance dated Jun. 4, 2019.
Venezia, Paul, "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
"Mining Specification of Malicious Behavior"—Jha et al., UCSB, Sep. 2007 https://www.cs.ucsb.edu/.about.chris/research/doc/esec07.sub.--mining.pdf-.
"Network Security: NetDetector—Network Intrusion Forensic System (NIFS) Whitepaper", ("NetDetector Whitepaper"), (2003).
"When Virtual is Better Than Real", IEEEXplore Digital Library, available at, http://ieeexplore.ieee.org/xpl/articleDetails.isp?reload=true&arnumbe-r=990073, (Dec. 7, 2013).
Abdullah, et al., Visualizing Network Data for Intrusion Detection, 2005 IEEE Workshop on Information Assurance and Security, pp. 100-108.
Adetoye, Adedayo , et al., "Network Intrusion Detection & Response System", ("Adetoye"), (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I. , "PyFlag—An advanced network forensic framework", Digital investigation 5, Elsevier, (2008), pp. S112-S120.
Costa, M., et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).

(56) References Cited

OTHER PUBLICATIONS

Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.-N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham, "Insertion, Evasion, and Denial of Service: Eluding Network Intrusion Detection", Secure Networks, ("Ptacek"), (Jan. 1998).

* cited by examiner

MALWARE DETECTION VERIFICATION AND ENHANCEMENT BY COORDINATING ENDPOINT AND MALWARE DETECTION SYSTEMS

RELATED APPLICATION

This application is a continuation of U.S. patent application Ser. No. 15/633,226, filed Jun. 26, 2017, now U.S. Pat. No. 10,462,173, issued Oct. 29, 2019, which claims priority from commonly owned Provisional Patent Application No. 62/357,119, entitled MALWARE DETECTION VERIFICATION AND ENHANCEMENT BY COORDINATING ENDPOINT AND MALWARE DETECTION SYSTEMS, by Ashar Aziz et al., filed on Jun. 30, 2016 the contents of which are incorporated herein by reference.

FIELD OF THE INVENTION

The present invention relates generally to cyber security and more particularly to verifying and enhancing the detection of a cyber-attack on a network.

BACKGROUND OF THE INVENTION

A cyber-attack may employ malware (malicious software), which may include a computer program or file that is harmful to a computer, computer network, and/or user. Conventional antivirus applications may be employed at computers, such as, for example, laptops and servers connectable as nodes (e.g., endpoints) of a network, to identify viruses and other malware using a signature-based approach. Antivirus applications identify malware using an antivirus engine that compares the contents of a file to a database of known malware signatures. Advanced malware often avoids detection by antivirus applications. Advanced malware is often polymorphic in nature, that is, changes its "fingerprint" while maintaining its central malicious functionality, thus avoiding matches against the signature database. Also, advanced malware is often custom-designed for use against targeted users, organizations or industries and not re-used against other targets. As such, targeted malware will often not match signatures of known generic malware. Given that advanced malware is able to circumvent conventional anti-virus analysis, this approach has been determined to be deficient.

Another solution employs a malware detection system to identify malware at the network periphery. In some solutions, detection at the network periphery may utilize a conventional network intrusion detection system (IDS) often incorporated into network firewalls to compare signatures of known malware against traffic for matches while, in other solutions, a two-phase network security appliance (NSA) may be employed. The two-phase approach may compare in-bound network traffic against known characteristics of malware in a static analysis phase and identify malicious behaviors during execution of the content in a dynamic analysis phase.

Detection at the network periphery may be limited by the capability of the malware detection system for precise and effective detection without excessive false positives (wrongly identified attacks) on the one hand (such as is often the case with IDSs), and for timely analysis of behaviors on the network traffic to prevent network intrusion on the other (such as may be the case with some NSAs pending completion of their analysis). Furthermore, the analysis at the network periphery may not provide sufficient information about the particular target or targets (e.g., endpoints) within the network and the potential scope and severity of the attack.

Moreover, the proliferation of malware detection systems and security software has inundated network administrators with security alerts. Actionable intelligence may be buried within these security alerts; however, the sheer number of the alerts makes it difficult for network administrators to identify high priority alerts, a situation exacerbated by the presence of false positives. Moreover, the alerts may not contain sufficient information regarding the progression of the attack once inside the network. Accordingly, a network manager may be unable to identify whether a cyber-attack is in progress or has even occurred and to determine appropriate and timely actions to contain and remediate potential damage.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

DETAILED DESCRIPTION OF THE INVENTION

Overview

Figure 1:
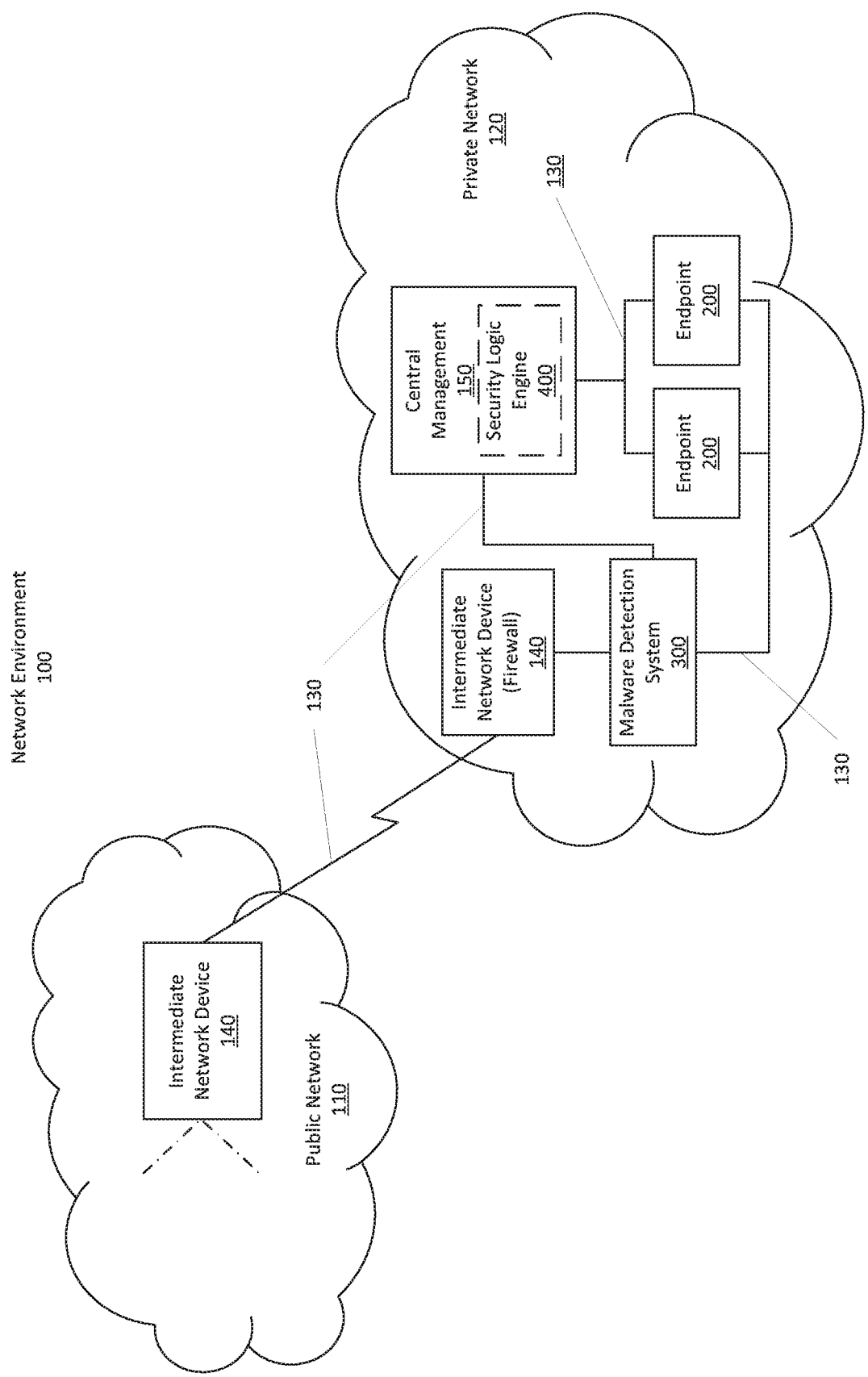
FIG. 1 is a block diagram of a network environment in accordance with one or more embodiments described herein.

Aspects of the invention reside in the interoperation of a network endpoint and a network connected malware detection system for the detection and/or verification of malware threats to mitigate or prevent data theft, operational compromise and other cyber-attack effects. The network endpoint ("endpoint") and malware detection system ("MDS") may coordinate and enhance their respective detection capabilities and even block malware as well as predict future victims. An endpoint (e.g., a computing device connectable to a network, such as a laptop, desktop, server, etc.) may detect behaviors of an object or a suspicious object during the endpoint's normal operation, and trigger an MDS to process the object for further detection and analysis. The results from the endpoint and MDS are combined and correlated to classify the object as malicious or benign. This technique may be used to automatically determine, without human intervention, whether the network is under a cyberattack, evaluate the scope and target(s) of the cyber-attack, assess the risk to the network, identify and trace the path of the cyber-attack on the network, and recognize polymorphic malware used in an attack.

An endpoint may be configured to monitor the behaviors of an object processed by the endpoint. The behaviors may be indicative of malware. In an embodiment, an endpoint processes an object (e.g., processing of a document file, etc.), the endpoint collects information related to the behaviors ("events"), and communicates the events to a security logic engine ("SLE"). In one embodiment, a software-based agent installed on the endpoint may monitor, collect and store the events, and, in some embodiments, classify the collected events as anomalous (i.e., represent unexpected, undesired, or unwanted behaviors) or otherwise suspicious (i.e., associated with potential or actual cyber-attacks), depending on the embodiment. The endpoint may communicate all monitored events or only suspicious events to the SLE for further correlation and classification of the object. The communications from the endpoint may trigger further analysis of the object by the MDS, as described below.

The SLE may determine or verify a cyber-attack by combining the analysis results of the endpoint and MDS. In some embodiments, a SLE may coordinate analyses of the object by the MDS in response to information received by the SLE from the endpoint, to obtain enhanced analysis results and make or verify a determination of maliciousness. The SLE may perform correlation of the respective analysis results and classification of the object as malicious or benign. The SLE may initiate and coordinate additional analyses of the suspicious object to identify other endpoints on the network that may be vulnerable to the verified malicious object by directing processing of the object by the MDS or endpoint(s) to collect further features related to the processing of the object. These endpoints may not yet be affected by the malware or the effects of the malware may not have been observed, as yet. By determining whether the malware may affect currently unaffected endpoints, the SLE may determine the scope of the threat, the target of the threat, and/or "predict" new victims susceptible to the malicious object.

The MDS may be contained within a special-purpose, dedicated malware detection appliance or a component in a general purpose computing device. As used herein, an appliance may be embodied as any type of general-purpose or special-purpose computer, including a dedicated electronic computing device, adapted to implement a variety of software architectures relating to exploit and malware detection functionality. The term "appliance" should therefore be taken broadly to include such arrangements, in addition to any systems or subsystems configured to perform a management function for exploit and malware detection, and associated with other equipment or systems, such as a network computing device interconnecting the WANs and LANs. The MDS may be available via a local network connection or remotely through the internet. The malware detection system may include a static analysis engine that may identify suspicious or malicious characteristics of an object, statically (operable without executing the object). Additionally, the MDS may utilize a dynamic analysis logic to process suspicious objects in an instrumented (i.e., monitored), virtual machine capable of detecting behaviors of the suspicious objects during processing. The dynamic analysis logic may be configured with (and run) an operating system and one or more applications (collectively, the "software profile") that the suspicious object may expect or need for effective processing, and the software profile may include the same type of software run on the endpoint. By so doing, the software environment in which the endpoint monitored the suspicious behaviors may be replicated in the software profile run on the MDS. In this way, behaviors that may be exhibited only in the presence of those applications will be detected. The SLE (which may be a component of the MDS in some embodiments) may combine the results of the static and dynamic analyses to classify the object as malicious or benign.

During operation, for example, the MDS may receive a suspicious object from an endpoint, when connected to the network, along with information regarding the software profile of the endpoint and behavioral features identified by the endpoint (indicators of compromise or "IOC's" for short) during processing. The suspicious object received by the MDS may be processed in a virtual machine of the dynamic analysis logic, which observes the behaviors exhibited by the virtual machine during the processing of the object. In some embodiments, the dynamic analysis logic may guide the processing and monitoring of the object in response to the information received by the MDS from the endpoint (e.g., specific behaviors to monitor, specific responses to dialog boxes or requests for further user input). Therefore, the MDS may receive an information package from the endpoint indicating an object ID, IOC's and context related to the processing of the object at an endpoint, and conduct the further malware analysis accordingly on the object.

The statically detected characteristics and/or dynamically observed behaviors (collectively, "features") of the suspicious object, during processing by the MDS, may be provided to a classification engine for classification of the object as malicious or benign. The classification engine of the MDS may generate a classification of the suspicious object based on a correlation of the features with known features of malware and benign objects. The known features of malware are determined based on heuristics and experiential knowledge of previously analyzed malware. The classification of the suspicious object may be conveyed to an SLE for verification of the determination of maliciousness by combining the dynamic analysis results (of the MDS) with the monitored behaviors received from the endpoints. Verification of the determination of maliciousness may thus include correlation of the analysis results with those associated with a known corpus of benign and malicious objects for classification of the object.

In some embodiments, the SLE may coordinate further analyses by the MDS based on additional information received from another endpoint. For example, the SLE may direct the MDS to conduct additional analyses of the object using a different software profile, that is, the software profile of the other (additional) endpoint. The SLE, in response to receiving these additional analysis results from the MDS, may make or modify the determination of maliciousness (e.g., verify the first determination of maliciousness, etc.). The SLE may also modify the determination of maliciousness based on the monitored behaviors reported by the additional endpoint, which may have the same or different software profile and may report the same or different monitored behaviors. This enhanced determination of maliciousness may be used to evaluate or modify the risk represented by the malware to endpoints on the network. For example, a malicious object is determined to affect a greater set of applications, or versions of an application, included in the software profiles of the original and additional endpoints, and thereby represent a threat to a larger set of endpoints on the network running those software profiles. For example, an initial interoperation of a first endpoint and an MDS may indicate all versions of Office applications using Windows 8.1 are susceptible to a cyber-attack by an object. This may be reported to a network administrator. Subsequently, additional information received by the SLE from a second endpoint indicates that the same applications running on Windows 10 are also susceptible to the malicious object. Accordingly, the SLE may initiate an alert or report to the effect that the determination of maliciousness is verified and expanded to include the additional software profile information.

In still other embodiments, the SLE may predict an additional set of computers on the network may be at risk from malware by identifying a threat vector which may be common to these other endpoints. For example, if on Windows 8.1 all versions of Firefox are determined to be vulnerable to a malicious object, the SLE may direct the MDS to process the suspicious object using a software profile including Windows 10 and Firefox (if that software profile is available to the MDS) to predict the maliciousness of the suspicious object to Windows 10. Similarly, the SLE may direct an endpoint configured with one or more versions of Firefox running over Windows 10 to run the same object using a closely monitored and/or sandboxed (or otherwise protected) process to detect suspicious behaviors. Based on the features detected by the endpoints and/or the MDS, the SLE may determine if Windows 10 computers of the network are vulnerable to the malicious object. In response to this determination of maliciousness, the SLE may issue a security alert, determine the priority to mitigate or repair the threat, and/or identify further systems that may be affected. By correlating the features associated with the malware, the SLE may identify endpoints on the network that may be affected by the malicious object even if no IOCs in those endpoints have yet been reported.

The combined system, using the interoperation of endpoint(s) and an MDS to coordinate the detection and/or verification of malware, and, in some cases, prediction of malware threats to a network so as to mitigate or prevent data theft, operational compromise, and cyber-attack effects. The system may leverage endpoints as a distributed network of malware behavioral sensors to communicate with an MDS on the network for further analysis and combine the results by a SLE, which may be implemented as part of or separate from (and in communication with) the MDS and endpoint(s). The SLE may utilize the features identified by the endpoints and MDS to identify or verify malware, trace a malware attack within the network, predict additional vulnerable endpoints, and enhance the ability of a security administrator to protect the network.

Description of the Embodiments

FIG. 1 is a block diagram of a network environment 100 that may be advantageously used with one or more embodiments described herein. The network environment 100 may be organized as a plurality of networks, such as a public network 110 and/or a private network 120 (e.g., an organization or enterprise network). According to this embodiment, the public network 110 and the private network 120 are communicatively coupled via network interconnects 130, and provide network connectivity and communication to intermediary computing devices 140, such as network switches, routers and/or firewalls, one or more endpoint device(s) 200, a malware detection system (MDS) 300 and a security logic engine 400.

The intermediary computing devices 140 communicate by exchanging packets or messages (i.e., network traffic) according to a predefined set of protocols, such as the Transmission Control Protocol/Internet Protocol (TCP/IP). However, it should be noted that other protocols, such as the HyperText Transfer Protocol Secure (HTTPS) for example, may be advantageously used with the inventive aspects described herein. In the case of private network 120, the intermediary computing device 140 may include a firewall or other computing device configured to limit or block certain network traffic in an attempt to protect the endpoint devices 200 from unauthorized users and attacks. The endpoint device 200 is communicatively coupled with the security logic engine 400 by the network interconnects 130, and may provide metadata monitored and stored by the endpoint device 200 to the security logic engine 400. The malware detection system 300, security logic engine 400, and optionally one or more intermediary network device 140 are similarly connected by interconnects 130.

Figure 2:
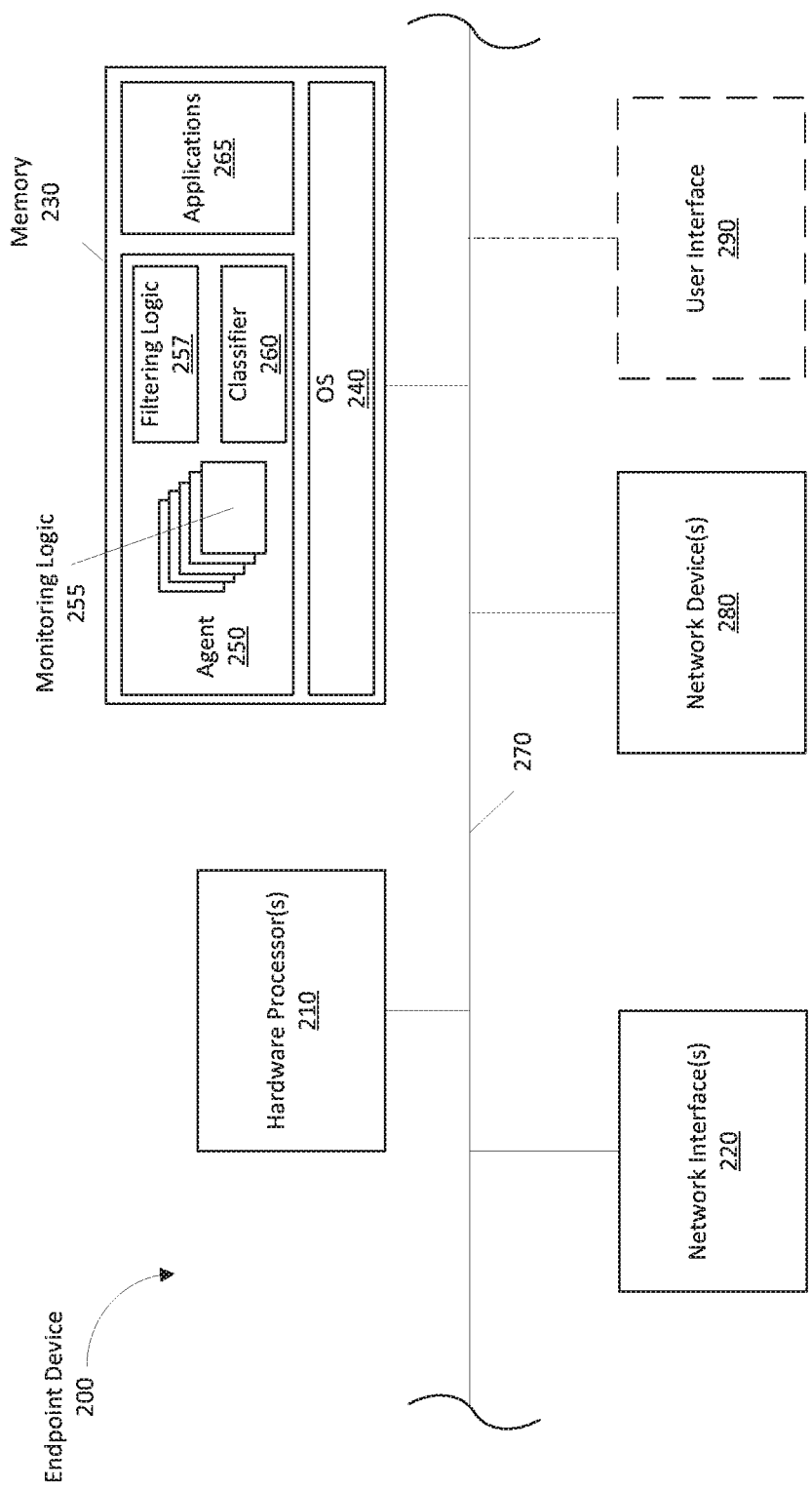
FIG. 2 is a block diagram of an endpoint device architecture in accordance with one or more embodiments described herein.

As illustrated in FIG. 2 in greater detail, the endpoint device 200 has physical hardware including hardware processors 210, network interface(s) 220, a memory 230, a system interconnect 270, and optionally, a user interface 290. The memory 230 may contain software comprising an operating system (OS) 240, one or more applications 265, an agent 250, event processing and filtering logic 257, and, in some embodiments, an endpoint device classifier 260. The physical hardware (e.g., hardware processors 210, network interfaces(s) 220, memory 230) may be connected for communication by the system interconnect 270, such as a bus. Generally speaking, an endpoint device 200 is a network-connected electronic device, such as a general purpose personal computer, laptop, smart phone, tablet or specialized device such as point of sale (POS) terminal and server.

The hardware processor 210 is a multipurpose, programmable device that accepts digital data as input, processes the input data according to instructions stored in its memory, and provides results as output. One example of the hardware processor 210 is an Intel® microprocessor with its associated instruction set architecture, which is used as a central processing unit (CPU) of the endpoint device 200. Alternatively, the hardware processor 210 may include another type of CPU, a digital signal processor (DSP), an application specific integrated circuit (ASIC), or the like.

The network device(s) 280 may include various input/output (I/O) or peripheral devices, such as a storage device, for example. One type of storage device may include a solid state drive (SSD) embodied as a flash storage device or other non-volatile, solid-state electronic device (e.g., drives based on storage class memory components). Another type of storage device may include a hard disk drive (HDD). Each network device 280 may include one or more network ports containing the mechanical, electrical and/or signaling circuitry needed to connect the endpoint device 200 to the private network 120 to thereby facilitate communications over the system network 100. To that end, the network interface(s) 220 may be configured to transmit and/or receive messages using a variety of communication protocols including, inter alia, TCP/IP and HTTPS. The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The memory 230 may include a plurality of locations that are addressable by the hardware processor 210 and the network interface(s) 220 for storing software (including software applications) and data structures associated with such software. The hardware processor 210 is adapted to manipulate the stored data structures as well as execute the stored software, which includes an operating system (OS) 240, one or more applications 265, an agent 250, and an endpoint device classifier 260.

The operating system (OS) 240 is software that manages hardware (e.g., hardware processors 210, network interface(s) 220, memory 230, network device(s) 280, etc.), software resources, and provides common services for computer programs, such as applications 265. For hardware functions such as input and output (I/O) and memory allocation, the operating system 240 acts as an intermediary between applications 265 and the computer hardware, although the application code is usually executed directly by the hardware and frequently makes system calls to an OS function or be interrupted by it.

The agent 250 is an executable software component configured to monitor the behavior of the applications 265 and/or operating system 240. The agent 250 may be configured to monitor (via monitoring logic 255), and store metadata (e.g., state information, memory accesses, process names, time stamp, etc.) associated with content executed at the endpoint device and/or behaviors (sometimes referred to as "events") that may be associated with processing activity. Events are behaviors of an object that are exhibited by processes executed by the endpoint and are monitored by the agent 250 during the normal operation of the endpoint. Examples of these events may include information associated with a newly created process (e.g., process identifier, time of creation, originating source for creation of the new process, etc.), information about the type and location of certain data structures, information associated with an access to certain restricted port or memory address, or the like. The agent 250 may also retrieve and communicate off the endpoint device 200 to a remote electronic device such as the SLE 400 context information such as the contents of the endpoint device's memory or hard drive. Moreover, the monitoring logic 255 may be configurable so as to enable or disable the monitoring of select behaviors, activities or processes. In some embodiments, the agent 250 may include an event processing and filtering logic 257, which, for example, applies heuristics, rules or other conditions to the monitored behaviors, to identify anomalous or unexpected behaviors and determine if the object is suspicious. Notably, the endpoint may perform (implement) exploit and malware detection as background processing (i.e., minor use of endpoint resources) with user-directed data processing being implemented as its primary processing (e.g., majority use of endpoint resources). The processing and filtering logic 257, in some embodiments, may scan content being processed for matches with indicators (signatures). Also, in some embodiments, the agent 250 is configured to provide the events including the metadata to the endpoint device classifier 260 so as to classify the behaviors as suspicious or even malicious. Further information regarding an embodiment of an agent may be had with reference to U.S. Pat. No. 8,949,257 issued Feb. 3, 2015, entitled "Method and System for Collecting and Organizing Data Corresponding to an Event," the full disclosure of which being incorporated herein by reference.

The agent 250 may receive from the security logic engine 400 and/or malware detection system 300 a communication identifying a malicious object for elevated levels of monitoring and/or identifying certain specified behaviors or processes for monitoring. The communication identifying the malicious object may, by way of example, include signatures ("fingerprint"), indicators, and/or patterns or sequences of behaviors. Elevated levels of monitoring of the suspicious object may include modifying system settings or configuring the agent 250. System setting modification may include activating additional system monitors (via the monitoring logic 255) to further observe suspicious object execution and expediting communications of detection results to the SLE.

The agent 250 may provide metadata related to the monitored behaviors to the endpoint device classifier or classification engine 260 for classification of an object, e.g., as to threat level. The threat level may be indicated by the classifier 260 in any of various ways, such as indicating the object as malicious or suspicious, where "suspicious" imports less certainty or a lower threat level than a classification of "maliciousness." The agent 250 and classifier 260 may cooperate to analyze and classify certain observed behaviors of the object, based on monitored events, as indicative of malware. The classifier 260 may also be configured to classify the monitored behaviors as expected and unexpected/anomalous, such as memory access violations, in comparison with behaviors of known malware and known benign content as identified through the use of machine learning techniques and experiential knowledge.

In some embodiments, the agent 250 may utilize rules and heuristics to identify the anomalous behaviors of objects processed by the endpoint device 200. Examples of an anomalous behavior may include a communication-based anomaly, such as an unexpected attempt to establish a network communication, unexpected attempt to transfer data (e.g., unauthorized exfiltration of proprietary information, etc.), or an anomalous behavior may include an execution anomaly, for example, an unexpected execution of computer program code, an unexpected Application Programming Interface (API) function call, an unexpected alteration of a registry key, or the like. The endpoint device monitoring rules may be updated to improve the monitoring capability of the agent 250.

The endpoint device monitoring rules may be periodically or aperiodically updated, with the updates received by the agent 250 from the malware detection system 200 and/or the security logic engine 400. The update may include new or modified event monitoring rules and may set forth the behaviors to monitor. The monitoring logic 255 may be configured to implement the monitoring rules received by the endpoint device agent 250. For example, the agent 250 may be updated with new behavioral monitoring rules which may be provided to the monitoring logic 255, the monitoring logic configures the monitors with the monitoring rules received by the agent 250 for a certain running process or certain application 265, for example, to monitor for spawned additional processes. Alternatively, the behavioral monitoring rules may be received by the endpoint device 200 in response to a request from the endpoint device 200 to determine whether new rules are available, and in response, the new rules are downloaded by the endpoint device 200, provided to the agent 250, and used to configure the monitoring logic 255.

In some embodiments, an endpoint device 200 may include a separate user interface 290. The user interface 290 may produce a graphical or textual based representation to a user of the endpoint device 200. The user interface 290 provides the user with the ability to interact with the computer. The user interface 290 may not be present for an endpoint device that is not dedicated to a single user or does not require the interaction with a user.

Malware Detection System

Figure 3:
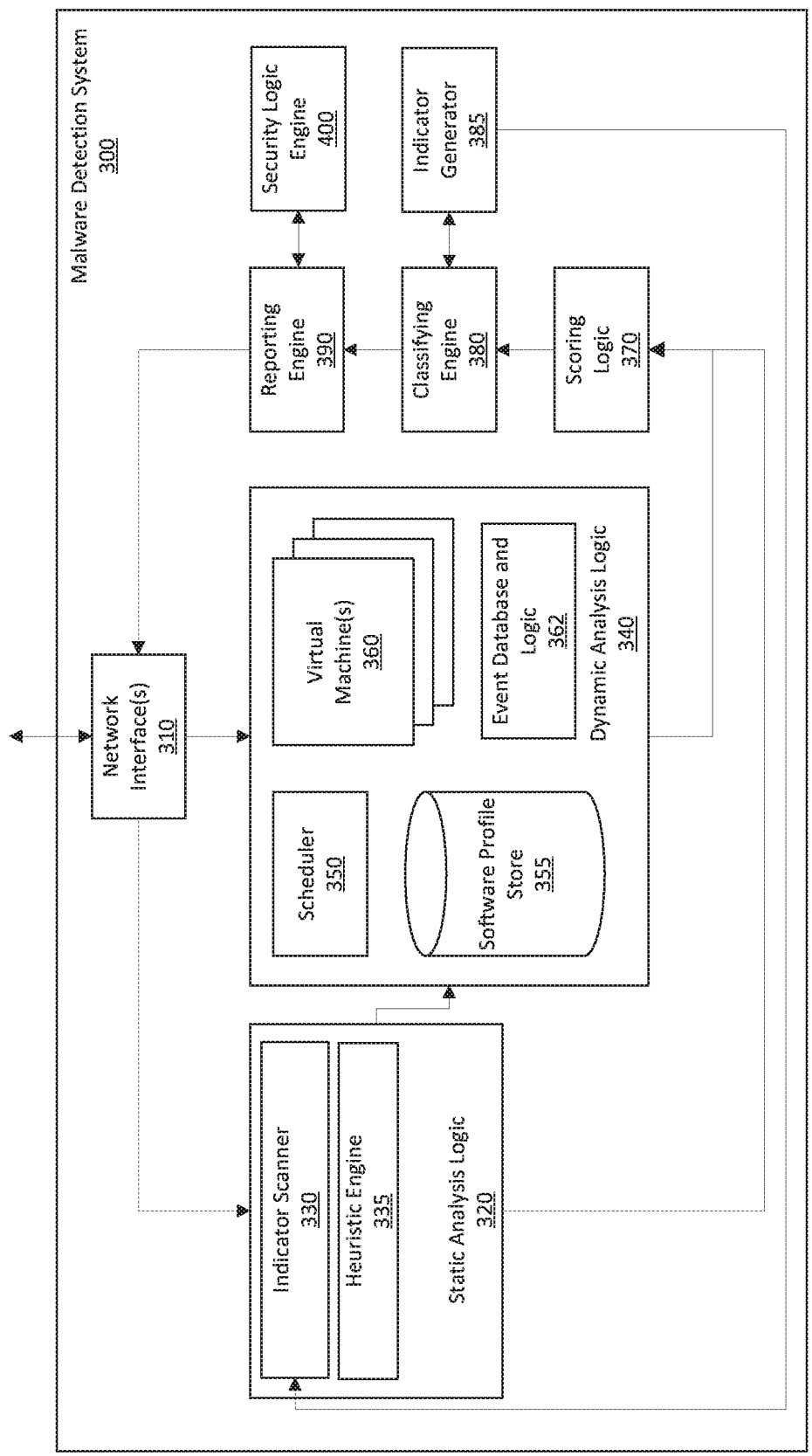
FIG. 3 is a block diagram of a malware detection system (MDS) in accordance with one or more embodiments described herein.

Referring now to FIG. 3, the malware detection system 300 can be implemented as a network security appliance. As used herein, an appliance may be embodied as any type of general-purpose or special-purpose computer, including a dedicated computing device, adapted to implement a variety of software architectures relating to exploit and malware detection and related functionality. The term "appliance" should therefore be taken broadly to include such arrangements, in addition to any systems or subsystems configured to support such functionality, whether implemented in one or more network computing devices or other electronic devices, equipment, systems or subsystems. Generally speaking, the malware detection system 300 may be implemented as one or more network-connected electronic devices, which each includes physical hardware comprising hardware processor(s), network interface(s), a memory, a system interconnect, an optional user interface, a system interconnect, which may be arranged and organized as shown in FIG. 2. Accordingly, each of the components of the malware detection system 300 shown in FIG. 3 and described below may be implemented as one or more computer programs or modules executable on one or more processors and stored in memory.

As thus embodied, the malware detection system 300 includes a network interface(s) 310, a static analysis logic 320 comprising at least an indicator scanner 330, and a heuristics engine 335, a dynamic analysis logic 340 comprising at least a scheduler 350, a store of software profiles 355, and one or more virtual machine(s) 360, an event database and logic 362, a classifying engine 380, an indicator generator 385, and a reporting engine 390. The malware analysis may involve static, dynamic and/or an optional emulation analysis, as generally described in U.S. Pat. No. 9,223,972, the entire contents of which are incorporated by reference.

The network interface(s) 310 may receive and capture network traffic transmitted from multiple devices without appreciably affecting the performance of the private network 120 or the devices coupled to the private network 120. In one embodiment, the malware detection system 300 may capture objects contained in network traffic using the network interface(s) 310, make a copy of the objects, pass the objects to the appropriate endpoint device(s) 200 and pass the copy of the objects to the static analysis logic 320 and/or the dynamic analysis logic 340. In another embodiment, the malware detection system 300 may capture the objects using the network interface(s) 310 and pass the objects to the static analysis logic 320 and/or the dynamic analysis logic 340 for processing prior to passing the objects to the appropriate endpoint device(s) 200. In such an embodiment, sometimes called a "blocking deployment," the objects will only be passed to the appropriate endpoint device(s) 200 (e.g., the destination of the network traffic as identified in network traffic packets) if the analysis of the objects does not indicate that the objects are associated with malicious, anomalous and/or unwanted characteristics and/or behaviors.

The network interface(s) 310 and static analysis logic 320 may be located at the periphery of the private network 120. The periphery of a private network 120 may be located at or near the interconnect(s) 130 between the private network 120 and other networks, e.g., behind a firewall (not shown) on the private network 120. For example, the network interface(s) 310 and static analysis logic 320 components of the malware detection system are located at the private network periphery while the dynamic analysis logic 340, scorer 370, classifier 380, indicator generator 385 and reporting engine 390 are each located on a remote server on the private network 120 or on a public network 110 connected to the private network 120 via interconnects 130. Alternatively, all of these components may be co-located at or near the periphery of the private network 120.

The static analysis logic 320 may receive the network traffic to then extract the objects and related metadata, or may receive the objects and related metadata from the network interface(s) 310 already extracted. The term "object" generally refers to a collection of data, whether in transit (e.g., over a network) or at rest (e.g., stored), often having a logical structure or organization that enables it to be classified for purposes of analysis. The static analysis logic 320 may provide the objects to the indicator scanner 330 to identify if the objects match known indicators of malware. The term "indicator" (or "signature") designates a set of characteristics and/or behaviors exhibited by one or more malware that may or may not be unique to the malware. Thus, a match of the signature may indicate to some level of probability that an object constitutes malware. In some contexts, those of skill in the art have used the term "signature" as a unique identifier or "fingerprint." For example, a specific malware or malware family, may be represented by an indicator which is generated, for instance, as a hash of its machine code, and that is a special sub-case for purposes of this disclosure. The indicator scanner 330 may incorporate, in memory (not separately shown), a database of known malware indicators. The database of known malware indicators may be updated by receiving through the network interface(s) 310 from the public network 110 or the private network 120, via network interconnects 130, new indicators of malware. The database of indicators may also be updated by the indicator generator 385.

The heuristics engine 335 determines characteristics of the objects and/or network traffic, such as formatting or patterns of their content, and uses such characteristics to determine a probability of maliciousness. The heuristic engine 335 applies heuristics and/or probability analysis to determine if the objects might contain or constitute malware. Heuristics engine 335 is adapted to analyze certain portions of the network traffic, constituting an object (e.g., the object may include a binary file), to determine whether a portion of the network traffic corresponds to either, for example: (i) a "suspicious" identifier such as either a particular Uniform Resource Locator "URL" that has previously been determined as being associated with known malware, a particular source or destination (IP or MAC) address that has previously been determined as being associated with known malware; or (ii) a known malicious pattern corresponding with malware. The heuristics engine 335 may be adapted to perform comparisons of an object under analysis against one or more pre-stored (e.g., pre-configured and/or predetermined) attack patterns stored in memory (not shown). The heuristics engine 335 may also be adapted to identify deviations in messaging practices set forth in applicable communication protocols (e.g., HTTP, TCP, etc.) exhibited by the traffic packets containing the object, since these deviations are often characteristic of malware. A match of an identifier may indicate, to some level of probability, often well less than 100%, that an object constitutes malware. The identifiers may represent identified characteristics (features) of the potential malware. The heuristics engine 335 may include scoring logic to correlate one or more characteristics of potential malware with a score of maliciousness, the score indicating the level of suspiciousness and/or maliciousness of the object. In one embodiment, when the score is above a first threshold, the heuristic engine 335 may generate an alert that the object is malicious. When the score is greater than a second threshold but lower than the first threshold, the object may be provided to the static analysis logic and/or the dynamic analysis logic for further analysis. When the score is less than the second threshold, the threat detection system may determine no further analysis is needed (e.g., the object is benign).

For dynamic analysis, the static analysis engine 320 may provide the object to the scheduler 350. The scheduler 350 is responsible for provisioning and instantiating a virtual machine to execute the object at a schedule time. In some embodiments, the heuristic module 335 transmits the metadata identifying a destination device to the scheduler 350, which can then provision a virtual machine with software (operating system (OS) and one or more applications) and other components appropriate for execution of the network data (data packets or objects), which in some cases are those associated with the destination device. In other embodiments, the scheduler 350 receives one or more data packets of the network traffic from the network interface(s) 310 and analyzes the one or more data packets to identify the destination device. A virtual machine is executable software that is configured to mimic the performance of a device (e.g., the destination device).

The scheduler 350 can configure the virtual machine to mimic the performance characteristics of a destination device that are pertinent for behavioral monitoring for malware detection. The virtual machine can be provisioned from the store of software profiles 355. In one example, the scheduler 350 configures the characteristics of the virtual machine to mimic only those features of the destination device that are affected by an object to be executed (opened, loaded, and/or executed) and analyzed. Such features of the destination device can include ports that are to receive the network data, select device drivers that are to respond to the network data and any other devices coupled to or contained within the destination device that can respond to the network data. In other embodiments, the dynamic analysis logic 340 may determine a software profile, and then configures one or more virtual machine(s) 360 with the appropriate ports and capabilities to receive and execute the network data based on that software profile. In other examples, the dynamic analysis logic 340 passes the software profile for the network data to the scheduler 350 which either selects from the store of software profiles 355 or configures the virtual machine based on that profile.

The store of software profiles 355 is configured to store virtual machine images. The store of software profiles 355 can be any storage capable of storing software. In one example, the store of software profiles 355 stores a single virtual machine image that can be configured by the scheduler 350 to mimic the performance of any destination device on the private network 120. The store of software profiles 355 can store any number of distinct virtual machine images that can be configured to simulate the performance of any destination devices when processed in one or more virtual machine(s) 360.

The processing of an object may occur within one or more virtual machine(s), which may be provisioned with one or more software profiles. The software profile may be configured in response to configuration information provided by the scheduler 350, information extracted from the metadata associated with the object, and/or a default analysis software profile. Each software profile may include a software application and/or an operating system. Each of the one or more virtual machine(s) 360 may further include one or more monitors (not separately shown), namely software components that are configured to observe, capture and report information regarding run-time behavior of an object under analysis during processing within the virtual machine. The observed and captured run-time behavior information as well as effects on the virtual machine, otherwise known as features, along with related metadata may be provided to a scoring logic 370.

The scoring logic 370 generates a score used in a decision of maliciousness by the classification engine 380. The score may be a probability value (expressed in any of various ways such as, for example, a numerical value or percent) or other indicator (quantitative or qualitative) of security risk or so-called threat level. The determination of the score of the object processed by the malware detection system 300 may be based on a correlation of each of the features identified by the static analysis logic 320 and dynamic analysis logic 340. The features may include characteristics, where characteristics include information about the object captured without requiring execution or "running" of the object. Characteristics may include metadata associated with the object, including, for example, anomalous formatting or structuring of the object. The features may also include behaviors, where behaviors include information about the object and its activities captured during its execution or processing. Behaviors may include, but are not limited to, attempted outbound communications over a network connection or with other processes, patterns of activity or inactivity, and/or attempts to access system resources.

The scoring logic 370 may correlate one or more characteristics and monitored behaviors (features) with a weight of maliciousness. The weight of maliciousness reflects experiential knowledge of the respective features (characteristics or monitored behaviors) and their correlations with those of known malware and benign objects. For example, during processing, the dynamic analysis logic 340 may monitor several behaviors of an object processed in the one or more virtual machine(s) 360, where, during processing, the object (i) executes a program, (ii) the program identifies personally identifiable data (e.g., login information, plain-text stored passwords, credit information), (iii) the program generates and encrypts the data in a new file, (iv) the program executes a network call, and (v) sends the encrypted data via the network connection to a remote server (exfiltrates the data). Each individual event may generate an independent score, weighted by the scoring logic 370, the weight based on experiential knowledge as to the maliciousness of each associated event. The individual scores or a combined score across these events may be provided to the classifying engine 380. Alternatively, in some embodiments, the generation of a combined score may be performed by the classifying engine 380, or the scoring logic 370 and classification engine 380 may be combined into a single engine.

The classifying engine 380 may be configured to use the scoring information provided by scoring logic 370 to classify the object as malicious, suspicious, or benign. In one embodiment, when the score is above a first threshold, the heuristic engine 335 may generate an alert that the object is malicious. When the score is greater than a second threshold but lower than the first threshold, the object may be provided for further analysis to the static analysis logic and/or the dynamic analysis logic for further analysis. When the score is less than the second threshold, the classifying engine 380 may determine no further analysis is needed (e.g., the object is benign). The threshold of maliciousness may be fixed, modified by as security administrator, and/or modified based on network conditions (for example, if a network is experiencing anomalous network conditions, if many other clients of a similar type are under confirmed attack, etc.). The classifying engine 380 may be configured to classify the object based on the characteristics identified by the static analysis logic 320 and/or the behaviors (expected and unexpected/anomalous) monitored by the dynamic analysis logic 340. In some embodiments, the classifying engine 380 may use only the correlation information provided by the scoring logic 370. That is, a determination of whether the monitored behaviors represent expected or unexpected (anomalous) behaviors is rendered by correlating the monitored behaviors against behaviors of known malware. Results of the static analysis may also be used in the correlation and classification, e.g., by being combined with the results of the dynamic analysis to yield a combined score. In an embodiment, further static analysis and/or dynamic analysis may be performed at the MDS 300 based on the results of correlation and classification engines.

In some embodiments, the classifying engine 380 may provide objects classified as malicious to the indicator generator 385, which may then generate indicators associated with these malicious objects. Additionally, the indicator generator 385 may receive non-malicious objects to generate a suitable indicator associated with non-maliciousness. In some embodiments, the indicators may be "fingerprint" type signatures, formed as a hash of the object. Alternatively, or in addition, the indicators may include identification of observed features, including characteristics and behaviors. The indicators thus generated may be provided to the security logic engine 400 for further enhancement (e.g., with additional indication of features) using results provided by endpoint devices 200. The classifying engine 380 may alternatively bypass the indicator generator 385 if it determines that the analyzed object is not malicious. The indicators may be provided to the indicator scanner 330 for use in inspecting (by scanning) subsequently received objects. In some embodiments, the indicator generator 385 may also distribute the indicators to the endpoint devices 200 and/or the security logic engine 400.

If the malware detection system classifies the object as malicious based on a static analysis results and/or dynamic analysis results, the reporting engine 390 may signal to a network or security administrator for action by an appropriate alert. In an embodiment, the reporting engine 390 may report the indicators ("signatures") of detected behaviors of a process/object as indicative of malware and organize those indicators as reports for distribution to the endpoint devices 200.

As noted previously, the reporting logic 390 may be configured to generate an alert for transmission external to the malware detection system 300 (e.g., to one or more other endpoint devices 200, to the security logic engine 400, and/or to a central manager). The reporting logic 390 is configured to provide reports via the network interface(s) 310. The security logic engine 400, when external to the MDS 300, e.g., may be configured to perform a management function or a separate management system may be provided, depending on the embodiment, e.g., to distribute the reports to other MDS within the private network, as well as to nodes within a malware detection services and/or equipment supplier network (e.g., supplier cloud infrastructure) for verification of the indicators and subsequent distribution to other malware detection system and/or among other customer networks. Illustratively, the reports distributed by the management function or system may include the entire or portions of the original indicator reports provided by the MDS 300, or may include new versions that are derived from the original reports.

Security Logic Engine

Figure 4:
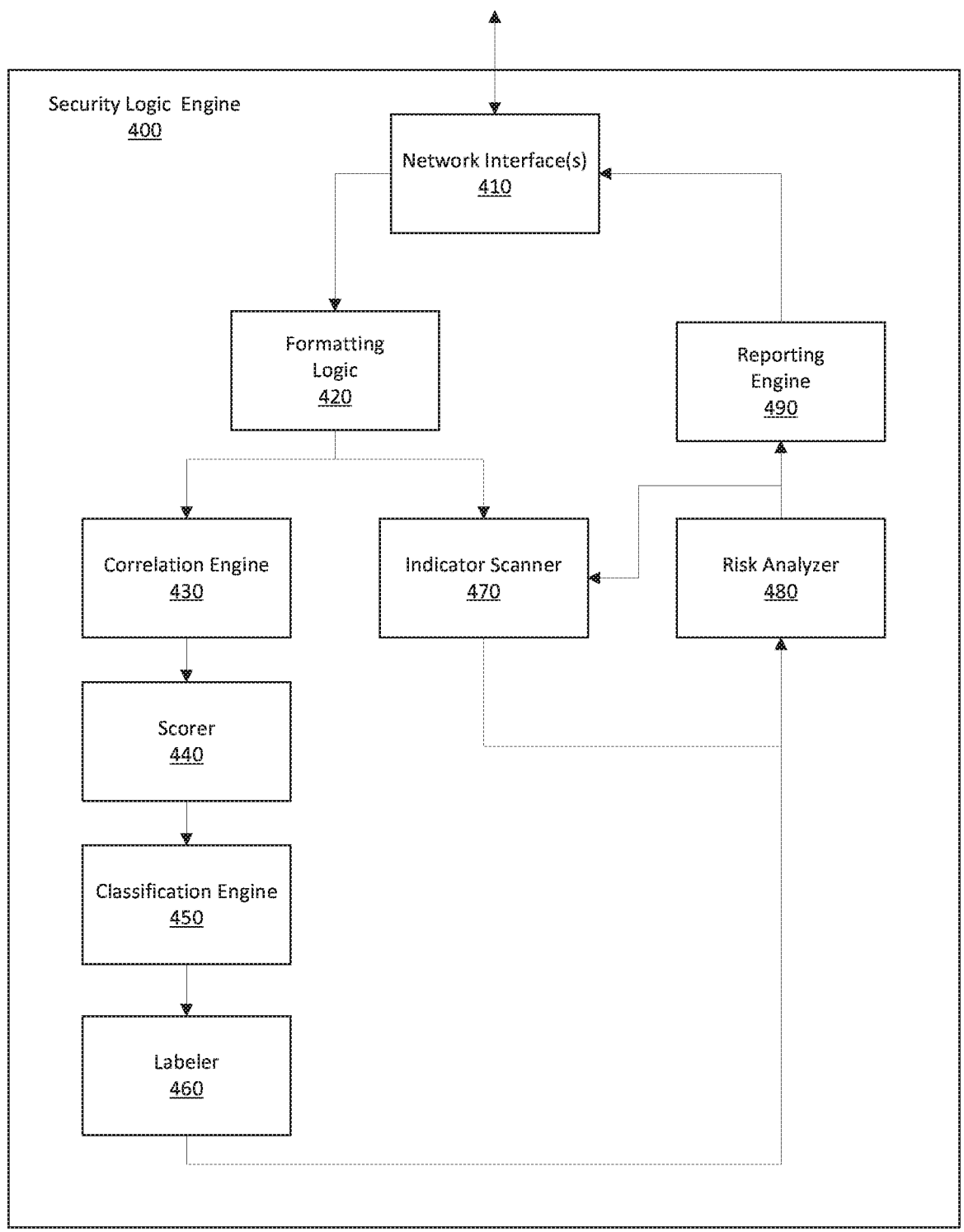
FIG. 4 is a block diagram of a security logic engine in accordance with one or more embodiments described herein.

As shown in FIG. 4, an embodiment of the security logic engine 400 includes a network interface(s) 410, a formatting logic 420, a correlation engine 430, a scoring logic 440, a classification engine 450, a labeler 460, a signature matcher 470, a risk analyzer 480, and a reporting engine 490. Generally speaking, the security logic engine 400 may be implemented as one or more network-connected electronic devices, which include(s) physical hardware comprising hardware processor(s), network interface(s), a memory, a system interconnect, an optional user interface, a system interconnect, arranged and organized as shown in FIG. 2. Each of the logic and engine components (including those just listed above) of the security logic engine 400 may be implemented as computer programs or modules executed by one or more processors and stored in memory.

The network interface(s) 410 can be coupled to a network such as private network 120 (FIG. 1) via the network interconnects 130. The network interface(s) 410 may support communication over a conventional link, such as over an Ethernet connection, USB connection, a FireWire connection, a serial connection, a parallel connection, or an ATA connection. The communication network interface(s) 410 may also support wireless communication (e.g., 802.11 a/b/g/n or wireless USB). It will be apparent to those skilled in the art that the communication network interface(s) 410 can support many wired and wireless standards. Where the SLE 400 is implemented within the MDS 300 and thus availed of network interface(s) 310, the network interface(s) 410 may be eliminated or disabled.

In some embodiments, a formatting logic 420 receives communication data from the network interface(s) 410 (or 310 of FIG. 3) and converts the data into a standardized format to be processed by other modules in the security logic engine 400 if not already in a suitable format. In general, the formatting logic 420 obtains data in disparate formats, which may often be device specific (e.g., an intermediary network device 140, malware detection system 300, endpoint device 200, etc.) or application version specific (e.g., endpoint device agent 250 version 1.0 may provide an output in a certain format and endpoint device agent version 2.0 may provide an output in a different format), and transforms the data into a readily consumable, common format. For example, the formatting logic 420 may transform data associated with a first endpoint device agent 250 to that of a common data format (e.g., JSON, etc.) such that any ensuing analysis and correlation with other devices may be provided using a common data format.

The correlation engine 430 may correlate the features received by the security logic engine 400 from an endpoint device 200 and the malware detection system 300 with known behaviors and characteristics of benign and malicious objects. Additionally, the correlation engine 430 may correlate the features received from the endpoint device 200 with those received from the malware detection system 300 to verify the determination of maliciousness obtained by the malware detection system 300 or determine the extent to which the features from these two vantage points (network periphery and endpoint) correlate with one another. The correlations just described in the preceding two sentences can be performed separately or in the same operation depending on the implementation, and in other embodiments one or the other may be eliminated altogether.

The results of the correlation performed by the correlation engine 430 may be provided to a scorer 440. The scorer 440 may generate a score based on each correlation of an observed feature with known behaviors and characteristics of benign and malicious objects. The classification engine 450 may utilize the scores generated by the scorer 440 to classify the object as malicious if it exceeds a threshold. The threshold may be fixed or dynamic. The maliciousness threshold may be "factory-set," "user-set," and/or modified based on information received via a network interface(s) 410.

The correlation engine 430 may be configured, depending on the embodiment, (a) to verify a classification of maliciousness made by the endpoint 200, (b) to provide greater or lesser confidence that an object processed by the endpoint 200 should be classified as malware, and/or (c) to determine whether the malware detection system 300 has received and is processing malware, and if so, whether the malware is the same as that detected by the endpoint 200. The first of these involves the correlation engine 430 to correlate at least the results of the endpoint 200 with those of the malware detection system 300. The last of these involves the correlation engine 430 correlating the features reported by the malware detection system 300 with those of known malware, and compare the correlation results with those obtained by the endpoint 200.

For example, the correlation engine 430 may receive, over a communication network via network interface(s) 410, (i) a feature set (features including behaviors and, in some embodiments, characteristics) monitored by the endpoint device agent 250, and (ii) a feature set (features including behaviors and, in some embodiments, characteristics) associated with an object classified by the malware detection system as malware, and in some embodiments, the associated score or threat level determined by the MDS. The correlation engine 430 may correlate the feature sets received from the endpoint device 200 and the MDS 300 to determine whether the endpoint 200 observed the same or similar features to those monitored in the MDS 300 on which its classification decision was based, and may also correlate those feature sets with known features exhibited by known malware and/or malware families. In so doing, the correlation engine 430 may apply correlation rules to determine whether the feature sets separately (or those common features of the feature sets) indicate or verify the object as malware. The correlation rules may define, among other things, patterns (such as sequences) of known malicious behaviors, and, in some embodiments, also patterns of known benign behaviors. For example, in looking at patterns, a behavior may be detected that appears benign, but when examined with other behaviors, may be indicative of malicious activity.

The scorer 440 generates a risk level or numerical score used in a decision of maliciousness by the classification engine 450. The score may be a probability value (expressed in any of various ways such as, for example, a numerical value or percent) or other indicator (quantitative or qualitative) of security risk or threat level. The determination of the risk level of the object processed by the MDS 300 and observed by the endpoint device 200 may be based on monitored events used by the correlation engine 430, including, for example, (i) the location from where the object originated (e.g., a known website compared to an unknown website), (ii) the processed object spawned a new process, and/or (iii) actions taken by received objects during processing (e.g., executable code contained in objects attempts to execute a callback). An object with an associated score (value) above a first threshold may indicate a suspicious object, i.e., an object with a certain probability of being malicious, and above a second, higher threshold may indicate that object should be classified as malware, i.e., an object with a high probability of being malicious. In some embodiments, the scorer 440 may increase or decrease a score provided by the MDS 300 or may generate its own score based on all the available features of the feature sets. For example, if the results of the correlation of monitored behaviors from the endpoint device 200 and the MPS 300 and, in some embodiments, features associated with known malware, reveal a level of similarity above a first predetermined threshold (e.g., 60% or 70%), the scorer 440 may so indicate in its score. The security logic engine 400 may classify the object as malware in response to the score generated by the scorer 440.

Accordingly, the classification engine 450 may be configured to use the correlation information provided by correlation engine 430 and the score provided by a scorer 440 to render a decision as to whether the object is malicious. Illustratively, the classification engine 450 may be configured to classify the correlation information, including monitored behaviors and characteristics, of the object relative to those of known malware and benign content. If a first probability of attack (score) is received by the security logic engine 400 from a malware detection system 300 and differs by a threshold amount or falls beyond a comparison "range" from the probability of attack (score) as determined by the classification engine 450, the security logic engine 400 may generate a second classification (the classification generated by the classification engine 450), and provide the second classification to the malware detection system 300 and report the second classification in an alert. The threshold or comparison range may be fixed, and/or based on a percentage of the initial classification by the malware detection system 300.

In an embodiment, the security logic engine 400 may include a labeler 460 configured to add names of malware or malware families to indicators (signatures) of malware. The labeler 460 may define a new malware family or add the identified malware to the malware family bearing the greatest similarity to the identified malware. The similarity may be based on a correlation, conducted by the correlation engine 430 or the labeler 460, of the identified malware behaviors with a database (not shown) of known malware family entries and associated behaviors. The database entry for the known malware family associated with the newly detected malware may be updated with any new features detected for the malicious object. Alternatively, the association of a malware family may be implemented in a separate module. The malware detection system 300 may update the indicator scanner 330 using the enhanced indicators generated by the labeler 460. These indicators may be used internally by the indicator scanner 470 of the security logic engine 400 or distributed externally as part of indicator reports to the malware detection system (s) 300 or endpoint device(s) 200.

The indicator scanner 470 receives, authenticates, and stores malware indicators, and scans results received from the malware detection system 300 and results received from an endpoint device 200 to determine, when they match, that the object under analysis is malicious. The indicator scanner 470 may also generate enhanced indicators based on the additional information received from the endpoint device 200.

The risk analyzer 480 determines the risk of harm to private network 120 from a verified malicious object based on the results provided by the classification engine 450 and labeler 460 and the indicator scanner 470. The risk analyzer 480 may base the risk of harm on information retrieved from a database regarding named malware or malware families. More specifically, the risk analyzer 480 may receive information about the object from the classification engine 450 and/or the labeler 460, which may also provide the observed behaviors from an endpoint device 200 and a malware detection system 300 as well as a malware family name and/or identified malware name. The risk analyzer 480 may also retrieve information from the network or be provided with information about network device properties (e.g., network location, connected users, operating system version, etc.) for use in its risk assessment. The risk analyzer 480 may also receive a classification of the malware from the classification engine 450 or the signature matcher 470. The risk analyzer 480 determines a risk to the private network 120 using experiential knowledge to correlate the information about the malicious object with the information about the network device properties. The correlation results in a risk profile for each endpoint device, which may be provided to a network administrator.

The risk analyzer 480 may identify endpoint device(s) 200 that may be affected by the cyber-attack involving the verified malicious object. The risk analyzer 480 may utilize the identified features and metadata of a verified malicious object to determine if the system configuration (where a system configuration may be characterized by its hardware and software profiles) of each endpoint device in the private network 120 is vulnerable to the attack. To determine the risk posed by the verified malicious object to each endpoint device 200, the risk analyzer 480 may correlate each feature and its metadata of the object (e.g., software profile running during processing of the object during which malicious behavior was observed) with system configuration attributes of the endpoints on the network. If an endpoint device system configuration correlates with the features and metadata of the verified malware, the risk analyzer 480 identifies the endpoint device as at risk to attack.

In some embodiments, the risk analyzer 480 may communicate to a malware detection system 300 that further analysis of the verified malicious object is necessary if the risk analyzer 480 cannot determine if the verified malicious object will behave maliciously when processed by endpoint device system configurations on the private network. The malware detection system 300 may conduct the further analyses with software profiles and other system characteristics as available to the malware detection system for use with its virtual machines.

The risk analyzer 480 may issue alerts to particular network devices (e.g., endpoint devices, network storage servers being accessed by an endpoint device 200 with a verified malicious object present) to restrict access from network devices found to be correlated with a high risk and/or may issue alerts to a network or security administrator via the reporting engine 490.

The reporting engine 490 is adapted to receive information from the signature matcher 470 and the risk analyzer 480 to generate alerts that identify to a user of an endpoint device, network administrator or an expert network analyst the likelihood of verified network cyber-attack. Other additional information regarding the verified malware may optionally be included in the alerts. For example, additional reported information may contain, in part, typical behaviors associated with the malware, particular classifications of endpoint devices or users that may be targeted, and/or the priority for mitigation of the malware's effects. Additionally, a user of an endpoint device that was to receive the objects and/or a network administer may be alerted to the results of the processing via alert generated by a reporting engine 490. The reporting engine 490 may also provide connected malware detection systems and endpoint devices 200 with updated information regarding malicious attacks and their correlation with particular behaviors identified by the security logic engine 400. Where the security logic engine is a component of the MDS 300, the reporting engine 490 may be eliminated or combined with reporting engine 390.

Figure 5:
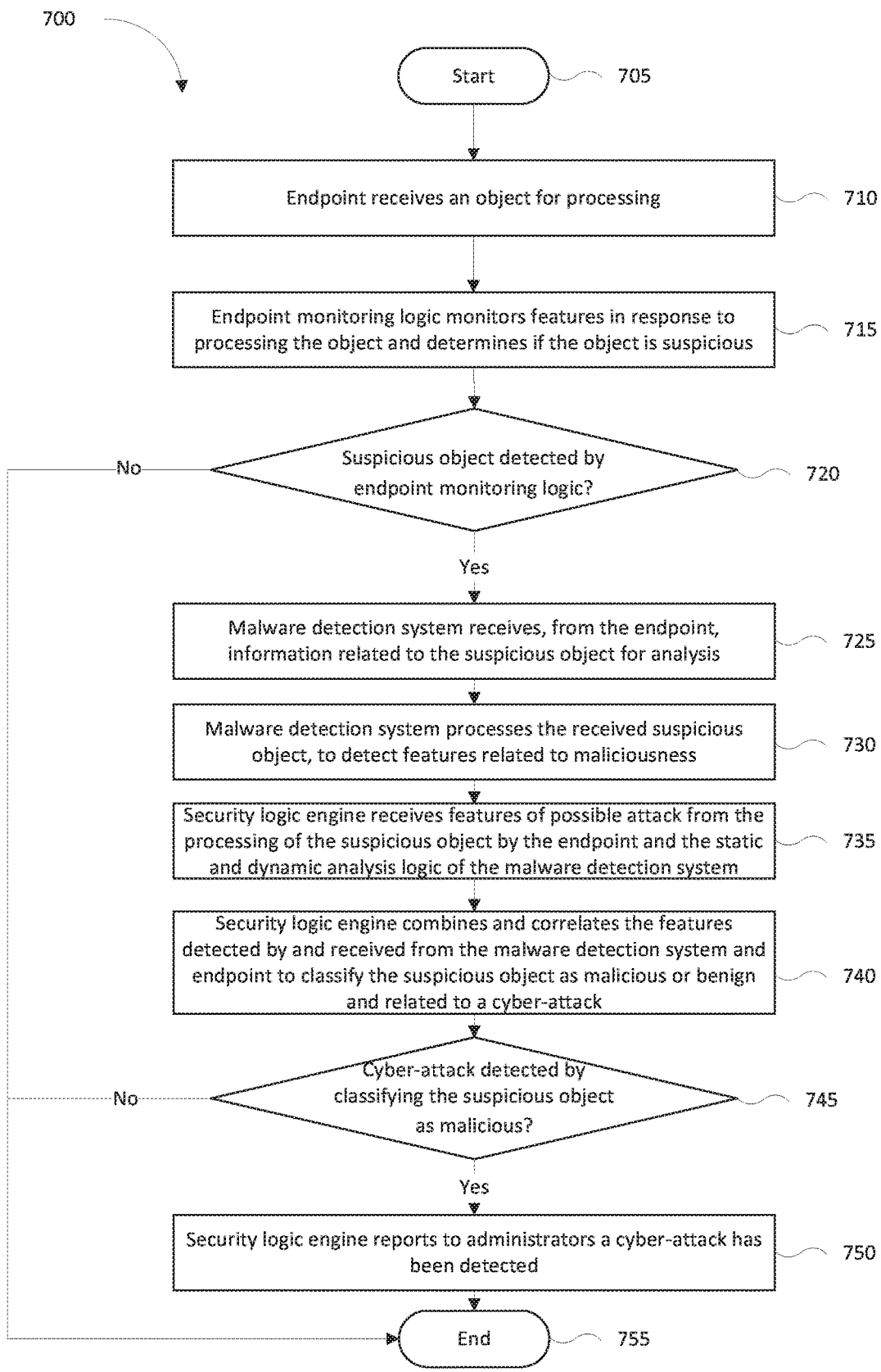
FIG. 5 is a flowchart of an exemplary method for enhancing endpoint cyber-attack detection in accordance with one or more embodiments described herein.

FIG. 5 represents an exemplary flowchart of a computerized method 700 for operating a cyber-attack detection system. The method 700 starts at step 705 and proceeds to step 710 wherein an endpoint (e.g., a user-operated laptop) begins processing an object. The object may be processed at an endpoint in response to a user action (e.g., in the case where the endpoint is, for example, a laptop, the opening of a document file initiated by a user, in the case where endpoint is, for example, a server, the processing of data on a server in response to a user action, etc.) or a command to process the object, for example, in the case where the endpoint is a server, and as a collateral result, to identify features of the object exhibited during processing to identify a cyber-attack. During step 715 features of the object are monitored and collected while the object is processed by the agent within the endpoint. For example, an object being processed as an executable may exhibit behaviors that may be identified by the endpoint, such as accessing memory outside of its allocated range, injecting data into another running and/or accessing sensitive system files. The features are monitored through the endpoint monitoring logic 255. In step 720 the endpoint determines, through correlation of detected features with the features of known malicious and benign objects, if the object is suspicious using the endpoint classifier 260. Suspicious features may be features that are associated with potential or actual cyber-attacks as well as anomalous (i.e., represent unexpected, undesired, or unwanted) behaviors. If the endpoint determines that no monitored behaviors of the object are suspicious, the method ends at step 755.

If the endpoint identifies features of the object that may be indicative of malware in step 720, the object analyzed may be suspicious. Features may be determined to be indicative of malware, and thus suspicious by the endpoint employing heuristics, black lists (or white lists), or by correlation with features of known malicious and benign objects based on experiential knowledge and machine learning. If the endpoint determines the object is suspicious, further analysis by a malware detection system may be triggered or otherwise initiated, for example, in response to a request from an endpoint. In step 725 the malware detection system receives information related to the object for further processing. The information received by the malware detection system may include the object itself and/or information related to the object (e.g., an identifier associated with the object—the identifier may be used to retrieve a copy of the object stored by a network traffic store such as a network storage system or facility and/or a network periphery device which may have stored the object). In some embodiments the MDS may receive the information related to the object directly from the endpoint which first processed the object, or in other embodiments through an intermediary network device (for example, a network device incorporating a security logic engine). The MDS, in response to the request for analysis of the object may determine if the suspicious object has already been classified as malicious or benign. In some embodiments, to determine if the suspicious object has already been classified, the MDS may access a local store of classifications associated with malicious and/or benign objects previously scanned or submit a request to a network based store of prior classifications. In some embodiments, if the MDS does not have access to the suspicious object for analysis (e.g., the suspicious object was received by the endpoint while it was not connected to a network protected by the MDS and therefore was not stored there), the MDS may request the object for analysis from one or more endpoints on the network (e.g., from the endpoint requesting the analysis of the suspicious object) or from a network traffic store connected to the MDS which may preserve (for a limited period of time) objects transmitted throughout the network. In some embodiments the endpoint may provide additional information about the context of the processing of the object by the endpoint, to the MDS, by providing information about the software profile of the endpoint (such as the operating system and applications available on the endpoint during processing of the object) and/or features detected during processing by the endpoint.

In step 730 the MDS may conduct an analysis of the suspicious object. In some embodiments, the MDS may conduct an analysis of the suspicious object using a static and/or dynamic analysis. The static analysis may, in part, include an indicator scanner 330 and/or a heuristics engine 335 which may utilize statically identified characteristics of the suspicious object to determine if the object is malicious. The dynamic analysis of the suspicious object may include processing the suspicious object in a dynamic analysis logic 340 (e.g., employing a virtual machine of the malware detection system 360) configured with monitoring mechanisms to identify behaviors associated with the executing the object by the virtual machine. In some embodiments the virtual machine may be configured with an operating system, and a set of one or more applications, which may be collectively referred to as a software profile. The software profile of the virtual machine may be consistent (identical and/or similar) with the software profile running on the endpoint having reported the suspicious object, with respect to the operating system and affected applications, or at least in so far as the object requiring processing in the virtual machine requires or expects to find the software running in its run-time environment. In some embodiments, the results (characteristics and behaviors) generated by the analysis of the MDS (including the characteristics identified by the static analysis engine and the behaviors monitored during processing the object in the dynamic analysis logic may be provided, as features, to an MDS correlation engine for determination of maliciousness. In still other embodiments these features detected by the MDS may be provided to a security logic engine for correlation and determination of maliciousness.

In step 735, the security logic engine 400 receives the detected features associated with the suspicious object from the MDS 300 and the endpoint 200. In some embodiments the SLE may be a component of the MDS whereby the SLE shall receive the detected features of the object processed via the reporting engine 390. The SLE may correlate the features received and combine the results of the analysis performed by the MDS 300 in step 730 with the monitored features from the endpoint device 200 in step 715. The combination of the features received by the SLE may be used to generate further correlations of those features with the features of known malicious and benign objects as determined from experiential knowledge and machine learning. If further correlations with features known (labeled) objects exceed a correlation threshold, as described herein, the SLE 400 in step 45 may identify a cyber-attack. If the determination of a cyber-attack cannot be made, the SLE 400 may await further monitored features to be received from the endpoint device 200 or end the analysis.

If the system determines the object is benign, proceed to step 755 where the process ends. If a determination of maliciousness is made, in step 755, the security event analyzing logic 400 may report the determination of a cyber-attack to a security administrator for remediation and/or mitigation.

In some embodiments, the SLE may poll (communicate with) another endpoint to determine whether the other endpoint has processed the same object or whether the other endpoint has detected similar behaviors.

Figure 6:
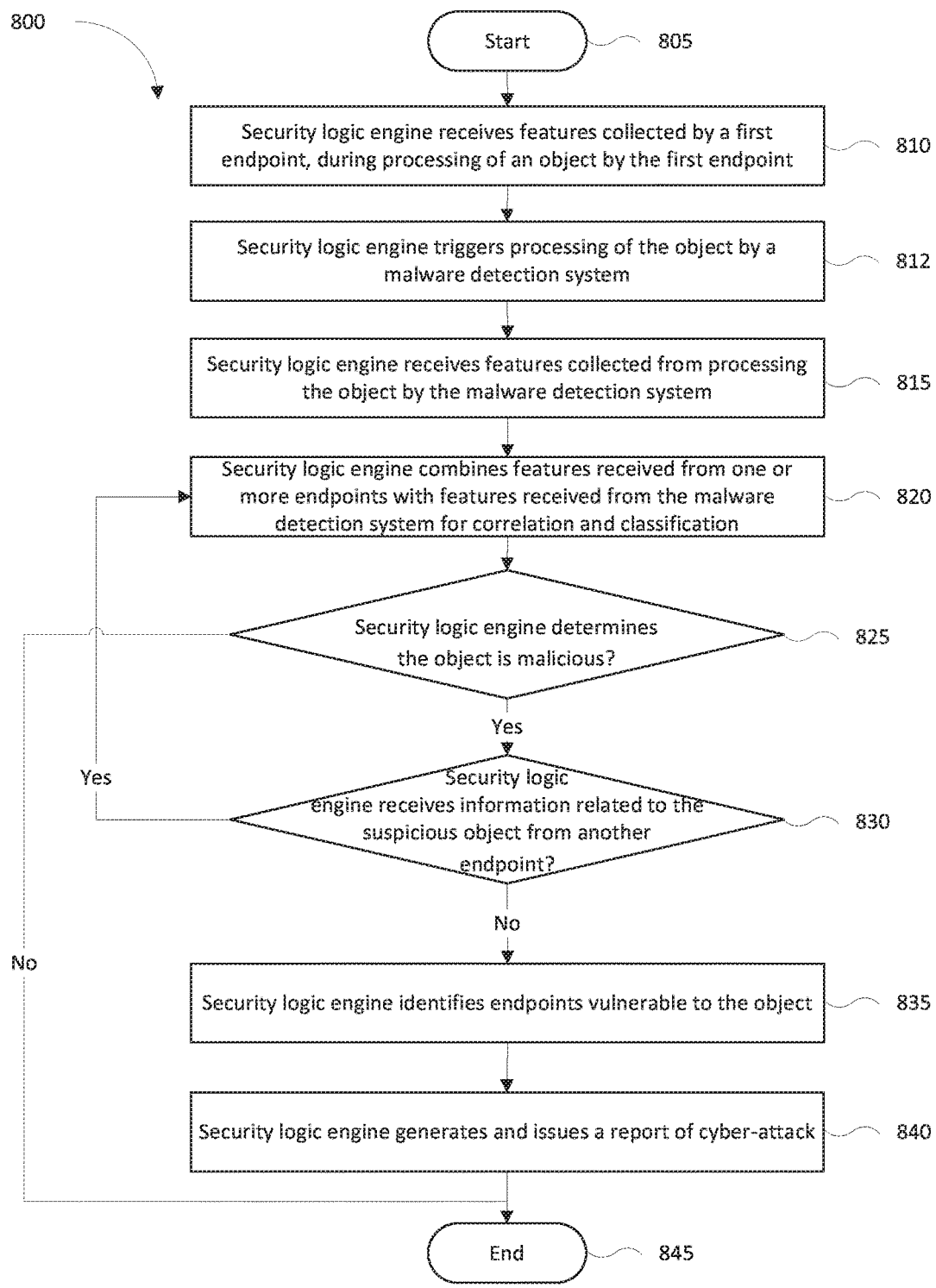
FIG. 6 is a flowchart of an exemplary method to configure improved techniques for enhanced endpoint cyber-attack detection in accordance with one or more embodiments described herein.

FIG. 6 depicts a flow chart for another exemplary computerized method for operating a security logic engine 400 of a cyber-attack detection system. The method 800 starts at step 805 and proceeds to step 810 where the security logic engine 400 receives features, from an endpoint 200, detected during processing of an object by the endpoint. The processing of the object by the endpoint may be user-initiated (e.g., an object may be a document file, and features are collected by the endpoint when the user opens the file and it is processed by a document viewing application or word processing application).

In step 812 the security logic engine, in response to receiving an indication of suspiciousness from the processing of the object by the endpoint, triggers the processing of the object by a malware detection system. The security logic engine may receive, from the endpoint (directly via a communication interface or indirectly via one or more intermediary devices such as a USB flash drive, network connected appliance, etc.) the object or an object identifier that may be used to retrieve the object. The indication of suspiciousness received by the security logic engine from the endpoint may result from applying a heuristic, at the endpoint, to features detected during processing of the object by the endpoint. In some embodiments, the indication of suspiciousness may result from a correlation of the features detected, during processing by the endpoint, with known malicious or benign objects. The SLE may receive from the endpoint an indication of suspiciousness resulting from a heuristic or correlation of the features detected, employed at the endpoint, and an identifier of the object or the object itself. The SLE may send a message to trigger, in step 815, in response to receiving the indication of suspiciousness, a malware detection system to process the object in a monitored runtime environment such as a virtual machine. The security logic engine may provide the object (or the object identifier) to the static analysis logic 320 and to dynamic analysis logic 340 of the malware detection system so that the object may be processed.

The method continues with the SLE 400 receiving features from the malware detection system 300 in step 815 by the static analysis logic 320 and dynamic analysis logic 340. In some embodiments, the processing and classification conducted by the malware detection system 300 may be directed by the SLE in response to receiving a suspicious object requiring further analysis and/or a security administrator. The malware detection system 300 processes the received network traffic using at least the static analysis logic 320 and/or dynamic analysis logic 340.

In step 820 the security logic engine 400 combines the features and/or information associated with processing the object received from the one or more endpoints 200 and the malware detection system 300. In some embodiments, where the security logic engine is a component of the malware detection system, the security logic engine may receive the information associated with processing the object through the reporting engine 390. In some embodiments, the malware detection system 300 may provide the security logic engine 400 a determination of maliciousness. The security logic engine may verify the malware detection system determination of maliciousness by correlating the received features (the features received from the one more endpoints 200 and the malware detection system 300), with the features of known malicious and benign objects to determine if the object is malicious. If the malware detection system determination of maliciousness and the security logic engine determination of maliciousness correspond, the determination of maliciousness is verified. If determination of maliciousness from the malware detection system 300 and the security logic engine 400 do not correspond, the determination of maliciousness by the security logic engine, based on features received from processing the object at least one endpoint and the malware detection system, supersedes the malware detection system determination of maliciousness and is not verified.

At step 825 the security logic engine 400 determines if the object is malicious based on the information and features related to processing the object that are received. If the object is determined to be malicious the method proceeds to step 840 where security alerts for an administrator are generated and issued by the system. The security alert generated may provide the object, the object identifier, a description of the threat posed to the network, a tracing of the cyber-attack in the network, and an identification of affected endpoints and/or endpoints which may be at risk to the cyber-attack. If the object is determined to not be malicious, the method may terminate in step 845. If the object is determined to be malicious, the method may continue to step 835, wherein the security logic engine 400 identifies endpoints on the network susceptible to the object. For example, the security logic engine 400 may identify endpoints susceptible to the object by identifying endpoints with a software profile similar to the first endpoint and/or the software profile used to configure the malware detection system 300 virtual machine (in step 815).

In some embodiments the method may continue to step 830 where the security logic engine 400 receives additional features detected while processing the same (or a similar) object by a second endpoint. A signature (e.g., a hash) of the object may be used to identify whether the second endpoint is processing the same object. The additional features from the second endpoint may be used by the security logic engine to modify the determination of maliciousness of the object. The additional features received from the second endpoint by the security logic engine in step 830 may be combined with the previously received features for correlation and classification in step 820. The combined features may, in step 825, the object(s) to be malicious. If the determination of maliciousness is in accord with the previous determination of maliciousness, the latter is verified. If the security logic engine modifies the determination of maliciousness for the object in step 820, the SLE may generate and issue a modified report of the cyber-attack. The procedure may proceed, if the object is determined non-malicious to step 845, to step 830 if additional features from the same or yet another endpoint are received by the security logic engine, or step 835 if the object is determined to be malicious and no additional features are received.

In some embodiments the additional features received from the second endpoint in step 830 may result in a feature correlation, with known malicious objects, so as to classify the object as malicious based on certain characteristics. For example, the vulnerability to cyber-attack caused by a malicious object t may only affect endpoints using both Windows 8.1 and Firefox 41.0 and 45.0. In some embodiments the security logic engine 400 may generate alerts for endpoints with the known characteristics of vulnerability. If an alert was generated and issued before the additional information from a second (or more) endpoint, the SLE may modify the existing alert and/or generate and issue another alert.

In still further embodiments, the additional features received from the second endpoint by security logic engine in step 830 may indicate that the object contains polymorphic code (i.e. code that allows the malicious program to mutate—have a different code signature—but maintain the original or core malicious functions and purpose). Polymorphic code may be identified in step 830 if objects, received from a plurality of endpoints, have similar behaviors but different code signatures. The similar behaviors may be identified by the security logic engine identifying a correlation between the objects received from the plurality of endpoints. The additional information related to the object received from another endpoint in step 830 may be used by the security logic engine to determine if the object contains polymorphic code by employing the correlation engine 430 of the security logic engine to determine if the features received from the plurality of endpoints in response to processing object correlate. The identification of polymorphic code may cause the scorer 440 to increase the maliciousness score of the object. The classification of the object in step 825 as malicious may lead the procedure to step 830 or to step 845 if determined to be not malicious.

If the security logic engine does not receive additional features (i.e. step 830 does not occur) and the object is not determined to be malicious, the process proceeds to step 845 where it ends. Conversely, if the security logic engine does not receive additional features and the object is determined to be malicious, the security logic engine generates and issues a report to a security administrator detailing the cyber-attack in step 840 and the procedure proceeds to step 845 where it ends. In some embodiments, the security logic engine may also send messages to endpoints affected by the malicious object, or to endpoints found by the SLE to be at risk of cyber-attack by the malicious object, to notify the endpoint or, via screen display or other alert, of the attack and in some embodiments, to block and/or prevent processing of the object by the endpoint.

In some embodiments, the security logic engine 400 may direct a malware detection system 300 to analyze an object, known to be malicious, to determine the risk posed to other endpoints on the network. For example, the security logic engine may make a determination that an object received from a first endpoint is malicious based on the features received in response to processing the object by the endpoint and a malware detection system. To determine if the object is malicious to other computers on the network the security logic engine may direct the malware detection system to process the object in a virtual machine configured with a software profile similar to at least one other endpoint on the network and collect features related to maliciousness. The security logic engine may receive these features to determine if the object is malicious to endpoints with a same or similar software profile based on the directed processing of the object in the malware detection system.

In yet another embodiment, the security logic engine 400 may direct a second endpoint on the network to collect and return monitored features resulting from processing the object and coordinate with the security logic engine to determine if the object is malicious to the second endpoint. The security logic engine may identify the second endpoint based on a risk to the network as identified by the SLE. For example, if a security logic engine receives features from a first endpoint with a first software profile and the security logic engine determines the object is malicious in coordination with a malware detection system, the security logic engine may identify a set of endpoints with a different software profile and direct at least one endpoint of the set of endpoints to return monitored features resulting from processing the object to the security logic engine for analysis. The security logic engine may combine the features received and correlate the results to classify whether the object is malicious to the set of endpoints. By directing the analysis of the object by at least one of the set of endpoints by the security logic engine, the security logic engine may determine if the object represents a cyberattack risk to the set of endpoints.

Figure 7:
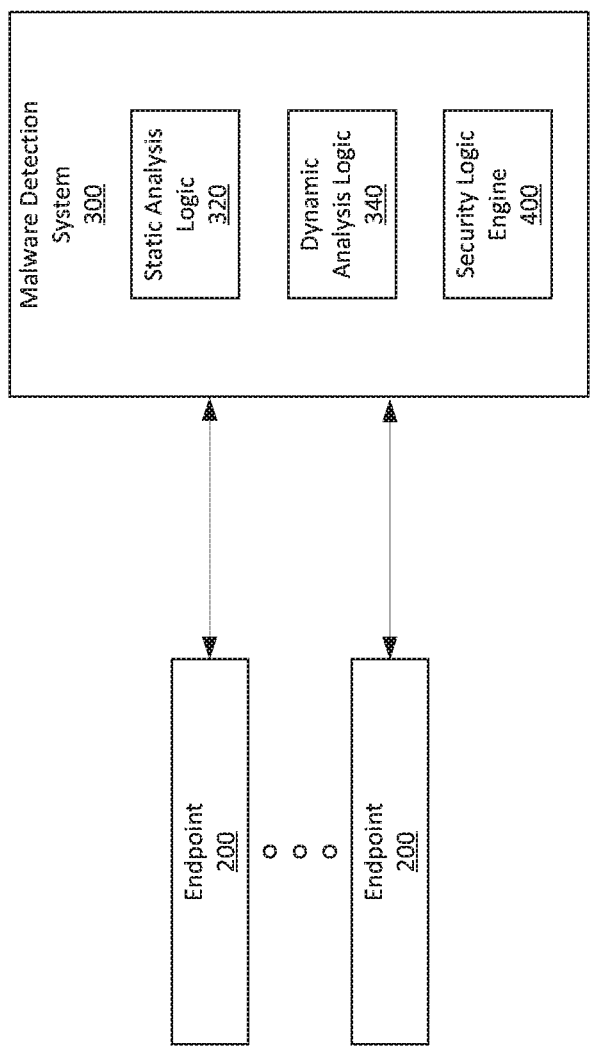
FIG. 7 is a block diagram of an interoperational malware detection and verification system in accordance with one or more embodiments described herein.

As shown in FIG. 7, an embodiment of the system includes a plurality of endpoints 200, a malware detection system 300, and a security logic engine 400. The security logic engine 400 may be implemented as a component of the malware detection system 300 (as shown in FIG. 7) or as a separate component. As a separate component the security logic engine 400 may be communicatively coupled with the endpoint 200 and/or the malware detection system 300 using communication interfaces, e.g., a network interface (such as over an Ethernet connection, USB connection, etc.). The endpoint 200 initiates the interoperative malware detection system (MDS) by identifying a suspicious object.

The endpoint 200 may identify a suspicious object and communicate at least an identifier of the suspicious object and/or the suspicious object to the MDS. The endpoint 200 may identify the suspicious object by monitoring the processing of the object. The object may be processed in response to user interaction (e.g., opening a document file from the internet, where the document is the object) or in response to an automated process (e.g., the endpoint receives an object from another system, via a network connection, for monitoring during processing). The endpoint may detect features related to the processing of the object at the endpoint. The endpoint may correlate these features with known features of malicious objects and classify the object as suspicious. If the endpoint determines the object is suspicious it may communicate at least the suspicious object or suspicious object identifier to an SLE or MDS. The endpoint may optionally also communicate a set of detected features and/or additional information about the endpoint (e.g., software profile information, such as the operating system, applications available on the endpoint, and/or the programs responsible for processing the object).

The suspicious object or suspicious object identifier may be communicated directly to the MDS or via a security logic engine (SLE). If the MDS and/or SLE receive a suspicious object identifier via a communication interface, each may retrieve the suspicious object from an object store (e.g., a network traffic storage system), a local store of objects, and/or by requesting the endpoint having communicated the suspicious object identifier return the object to each respective system.

The malware detection system 300 may receive the suspicious object (or suspicious object identifier by which the MDS may retrieve the suspicious object as previously described herein) for processing and classification as malicious or benign. In some embodiments, the MDS may receive the suspicious object through the integrated SLE component, or alternatively the MDS may retrieve the suspicious object directly. The MDS may process the suspicious object, to detect features, in at least a static analysis logic 320 or a dynamic analysis logic 340. The static analysis logic 320 may identify features of the object that may provide sufficient features for a correlation of the MDS to classify the suspicious object as malicious. In some embodiments the features detected by the static analysis logic may be used by the dynamic analysis logic 340 to guide feature detection during processing.

The dynamic analysis logic 340 may configure one or more virtual machine(s) (see FIG. 3) of the MDS for processing of the suspicious object. The virtual machine(s) may be configured with behavioral monitors to identify features resulting from the processing of the suspicious object in the virtual machine(s). In some embodiments, the dynamic analysis logic 340 of the MDS may receive software profile information related to the endpoint (e.g., endpoint operating system, applications available, etc.) that detected the suspicious object. The received software profile information may be used to configure the dynamic analysis logic 340 virtual machine(s). In some embodiments the dynamic analysis logic 340 may determine the configuration to be used by a virtual machine by communicating directly with the endpoint to identify the requirements of the software profile, and/or by querying an endpoint management system, storing information about endpoints on the network, to identify an appropriate software profile.

The features detected by the MDS by processing the suspicious object using the static analysis logic 320 and/or the dynamic analysis logic 340, may be correlated with features of known malicious objects to determine if the suspicious object is malicious or benign. The features detected by the MDS may be communicated to the SLE 400 and combined with information received by the SLE from the endpoint. The SLE may correlate the received information from the endpoint and the MDS to classify the suspicious object as malicious or benign. The classification done by the SLE, if consistent with the determination by the MDS, verifies the MDS determination of maliciousness.

Similarly, in an embodiment, the SLE may direct the MDS to process an object, in the virtual machine(s) configured with a software profile of an unaffected endpoint. The SLE may provide the object directly to the MDS or provide an object identifier by which the MDS may retrieve the object via the network. During processing of the object by the MDS in the virtual machine(s) the MDS may detect features associated with processing of the object. The features detected by the MDS may be provided by the MDS to the SLE for correlation and classification in combination with any features previously received by the SLE related to that object. By classifying the object with the features received from the MDS directed to process the object, the SLE may identify a set of endpoints on the network, with a given software profile, that may be vulnerable to the object.

In further embodiments, the SLE may identify polymorphic code by combining the features detected by at least two processing locations (e.g., MDS and endpoint, or between two endpoints, etc.). The SLE may determine that the features detected by the plurality of processing locations indicate identical behaviors that relate to maliciousness, however the objects have different code signatures. The different code signatures but identical behaviors may indicate the existence of malicious polymorphic code. If the object in which the polymorphic code is identified is found to be malicious by the SLE, the SLE may generate and issue an alert to a security administrator and/or to affected endpoints providing information about the malicious object.

In some embodiments, the SLE may determine the progress of a cyber-attack through the network. The SLE, having identified a cyber-attack based on features collected while processing an object by at least one endpoint and a malware detection system, may receive further features and/or information related to the cyber-attack (related to processing the object) from other endpoints on the network. In some embodiments this may include information from known affected endpoints related to communication with other endpoints, this communication may represent transmission of malicious content, related to the cyber-attack, to additional endpoints. By combining and analyzing the received information related to the cyber-attack, from the endpoints, the SLE may determine the scope of the attack and trace the attack through the network. The SLE may generate reports tracing the cyber-attack to be used in mitigation and repair of the network.

In some embodiments, if the SLE determines the suspicious object is malicious, the SLE may determine that a cyber-attack is underway and initiate mitigation techniques. The mitigation techniques may be initiated automatically by the SLE or in response to commands by a security administrator. A mitigation technique may include issuing an alert to affected endpoints regarding the malicious object and/or issuing an alert to endpoints with a similar software profile (and thus similarly vulnerable) as the affected endpoint. Another mitigation technique may include generating and distributing information to block and/or stop the malicious object from being processed by another endpoint on the network.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Moreover, the embodiments or aspects thereof can be implemented in hardware, firmware, software, or a combination thereof. In the foregoing description, for example, in certain situations, terms such as "engine," "component" and "logic" are representative of hardware, firmware and/or software that is configured to perform one or more functions. As hardware, engine (or component/logic) may include circuitry having data processing or storage functionality. Examples of such circuitry may include, but is not limited or restricted to a microprocessor, one or more processor cores, a programmable gate array, a microcontroller, an application specific integrated circuit, semiconductor memory, or combinatorial logic. Accordingly this description is to be taken only by way of example and not to otherwise limit the scope of the embodiments herein. Therefore, it is the object of the appended claims to cover all such variations and modifications as come within the true spirit and scope of the invention.

What is claimed is:

1. A computerized method to determine a potential cyber-attack being conducted on a network, comprising:
   receiving, by a security logic engine, a first set of events associated with a first object and a second set of events associated with a second object that is different from the first set of events, wherein (1) the first set of events is provided from a first endpoint of a plurality of endpoints within the network and each event of the first set of events corresponds to information related to a behavior that is monitored during processing of the first object by the first endpoint, and (2) the second set of events is provided from an analysis system different than any of the plurality of endpoints and each event of the second set of events corresponds to information related to a behavior that is monitored during processing of the second object by the analysis system;
   generating, by the security logic engine, a first determination of a likelihood of the cyber-attack being conducted on the network by at least correlating the first set of events and the second set of events with at least events associated with at least known malicious objects;
   generating, by the security logic engine, a first alert to report the first determination of the likelihood of the cyber-attack occurring at the first endpoint; and
   determining a scope of the cyber-attack by at least identifying whether one or more endpoints of the plurality of endpoints having a different software profile than the first endpoint are vulnerable to the cyber-attack based on (i) obtaining the different software profile from the one or more endpoints, (ii) providing the different software profile to the analysis system, (iii) receiving a third set of events corresponding to analysis results representing a processing of the first object by an endpoint with the different software profile, (iv) performing a second determination to confirm or modify the likelihood of the cyber-attack being conducted on the network based on the analysis results, and (v) generating a second alert to report the second determination to enlarge the scope of the cyber-attack in response to confirming the cyber-attack being directed to multiple of different endpoints within the network.

2. The computerized method of claim 1, wherein the analysis system is a malware detection system.

3. The computerized method of claim 2, wherein the second set of events comprise behaviors exhibited during processing of the second object in a first virtual machine of the malware detection system.

4. The computerized method of claim 2, wherein the security logic engine is a component of the malware detection system.

5. The computerized method of claim 2, wherein the identifying whether any endpoint of the plurality of endpoints is vulnerable further comprises:
   identifying a second software profile being the different software profile; and
   requesting the malware detection system to conduct the further analysis by at least configuring a virtual machine of the malware detection system with the second software profile.

6. The computerized method of claim 1, wherein the first alert includes one or more indicators associated with the first set of events or the second set of events that are indicative of malware.

7. The computerized method of claim 1, wherein the generating of the first determination further comprises correlating the first set of events and the second set of events with at least events associated with a corpus of known benign objects and the known malicious objects.

8. The computerized method of claim 1, wherein the second alert generated by the security logic engine further comprises information to prevent the processing of a third object, identical in functionality to the first object, by each of the plurality of endpoints.

9. The computerized method of claim 1, wherein the determining the scope of the cyber-attack by at least identifying whether an endpoint of the plurality of endpoints having a different software profile than the first endpoint invulnerable to the cyber-attack further comprises:
associating, by the security logic engine, each endpoint of the plurality of endpoints, communicatively coupled with the security logic engine, with a software profile; and
determining, by the security logic engine, a vulnerability of each endpoint of the plurality of endpoints in response to correlating between a vulnerable software profile and the software profiles of each endpoint.

10. The computerized method of claim 1, wherein the first object is identical in operation to the second object.

11. A non-transitory computer-readable medium including software that, upon execution within a security logic engine, conducts analyses to determine whether an object is malicious representative of a cyber-attack is being conducted on a network, comprising:
receiving a first set of events associated with a first object and a second set of events associated with a second object that is different from the first set of events, wherein (1) the first set of events is provided from a first endpoint of a plurality of endpoints within a network and each event of the first set of events corresponds to information related to a behavior monitored during processing of the first object by the first endpoint, and (2) the second set of events is provided from an analysis system different from an endpoint of the plurality of endpoints and each event of the second set of events corresponds to information related to a behavior monitored during processing of the second object by the analysis system;
generating, by the security logic engine, a first determination of a likelihood of the cyber-attack being conducted on the network by at least correlating the first set of events and the second set of events with at least events associated with at least known malicious objects;
generating a first alert to report the first determination of the likelihood of the cyber-attack occurring at the first endpoint; and
determining a scope of the cyber-attack by at least identifying whether one or more endpoints of the plurality of endpoints having a different software profile than the first endpoint are vulnerable to the cyber-attack based on (i) obtaining the different software profile from the one or more endpoints, (ii) providing the different software profile to the analysis system, (iii) receiving a third set of events corresponding to analysis results representing a processing of the first object by an endpoint with the different software profile, (iv) performing a second determination to confirm or modify the likelihood of the cyber-attack being conducted on the network based on the analysis results, and (v) generating a second alert to report the second determination to enlarge the scope of the cyber-attack in response to confirming the cyber-attack being directed to multiple of different endpoints within the network.

12. The non-transitory computer-readable medium of claim 11, wherein the second set of events comprise behaviors exhibited during processing of the second object in a first virtual machine of the analysis system being a malware detection system.

13. The non-transitory computer-readable medium of claim 12, wherein the security logic engine is a component of the malware detection system.

14. The non-transitory computer-readable medium of claim 11, wherein the first alert includes one or more indicators associated with the first set of events or the second set of events that are indicative of malware.

15. The non-transitory computer-readable medium of claim 11, wherein the generating of the first determination further comprises correlating the first set of events and the second set of events with at least events associated with a corpus of known benign objects and the known malicious objects.

16. The non-transitory computer-readable medium of claim 11, wherein the second alert, generated by the security logic engine, further comprises information to prevent the processing of the first object by each of the plurality of endpoints.

17. The non-transitory computer-readable medium of claim 11, wherein the software, during execution, determining the scope of the cyber-attack by at least identifying whether an endpoint of the plurality of endpoints having a different software profile than the first endpoint is vulnerable to the cyber-attack by at least:
associating each endpoint of the plurality of endpoints, communicatively coupled with the security logic engine, with a software profile; and
determining a vulnerability of each endpoint of the plurality of endpoints in response to correlating between a vulnerable software profile and the software profiles of each endpoint.

18. The non-transitory computer-readable medium of claim 11 including the software that, upon execution within the security logic engine, further conducts analyses comprising:
receiving information related to communications between one or more endpoints and the first endpoint having processed the first object; and
determining one or more endpoints of the plurality of endpoints other than the first endpoint are at risk of being subject to the cyber-attack.

19. The non-transitory computer-readable medium of claim 11, wherein the first object includes malware operating equivalently to malware within the second object.

* * * * *